United States Patent
Shimoshikiryo

(10) Patent No.: US 7,450,207 B2
(45) Date of Patent: Nov. 11, 2008

(54) LIQUID CRYSTAL DISPLAY DEVICE COMPRISING A PICTURE ELEMENT REGION INCLUDING DIFFERENT ELECTRIC FIELD STRENGTH REGIONS

(75) Inventor: Fumikazu Shimoshikiryo, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 194 days.

(21) Appl. No.: 10/941,851

(22) Filed: Sep. 16, 2004

(65) Prior Publication Data
US 2005/0041186 A1 Feb. 24, 2005

Related U.S. Application Data

(63) Continuation of application No. 09/783,217, filed on Feb. 15, 2001, now Pat. No. 6,850,301.

(30) Foreign Application Priority Data

Mar. 17, 2000 (JP) .............................. 2000-075705
Dec. 28, 2000 (JP) .............................. 2000-400170

(51) Int. Cl.
*G02F 1/1337* (2006.01)
*G02F 1/1343* (2006.01)
(52) U.S. Cl. ...................................... 349/129; 349/143
(58) Field of Classification Search ................. 349/129, 349/130–131, 143
See application file for complete search history.

(56) References Cited

U.S. PATENT DOCUMENTS

| | | | | |
|---|---|---|---|---|
| 5,309,264 A | * | 5/1994 | Lien et al. ................... 349/143 |
| 5,608,556 A | * | 3/1997 | Koma ........................ 349/143 |
| 5,666,179 A | | 9/1997 | Koma ........................ 349/143 |
| 6,100,953 A | * | 8/2000 | Kim et al. .................... 349/129 |
| 6,256,082 B1 | | 7/2001 | Suzuki et al. ............... 349/144 |
| 6,396,554 B1 | | 5/2002 | Matsuda ..................... 349/139 |
| 6,407,791 B1 | | 6/2002 | Suzuki et al. ............... 349/129 |
| 6,446,293 B2 | | 9/2002 | Lindquist et al. ............. 15/1.52 |
| 6,724,452 B1 | * | 4/2004 | Takeda et al. .............. 349/139 |
| 6,757,040 B1 | * | 6/2004 | Kim et al. ................... 349/129 |

FOREIGN PATENT DOCUMENTS

EP 0 884 626 12/1998
JP 11-109393 4/1999

OTHER PUBLICATIONS

U.S. Appl. No. 09/783,217, filed Feb. 15, 2001.

* cited by examiner

*Primary Examiner*—David C. Nelms
*Assistant Examiner*—W. Patty Chen
(74) *Attorney, Agent, or Firm*—Nixon & Vanderhye P.C.

(57) ABSTRACT

A first electrode 14 provided in a liquid crystal display device of a vertical alignment mode includes, for each picture element region, a lower conductive layer 11, a dielectric layer 12 covering the lower conductive layer 11, and an upper conductive layer 13 provided on one side of the dielectric layer 12 which is closer to a liquid crystal layer 30. The upper conductive layer 13 includes an upper layer opening 13a, and the lower conductive layer 11 includes a lower layer opening 11a, thus forming first, second and third regions (R1, R2, R3) having gradually decreasing electric field strengths. Liquid crystal molecules 30a of the liquid crystal layer 30 in an orientation-regulating region T1 in which the first, second and third regions are arranged in this order in a predetermined direction change the orientation direction thereof so that they are inclined in a single direction in the presence of an applied voltage.

1 Claim, 12 Drawing Sheets

LIQUID CRYSTAL DISPLAY DEVICE COMPRISING A PICTURE ELEMENT REGION INCLUDING DIFFERENT ELECTRIC FIELD STRENGTH REGIONS

This application is a continuation of application Ser. No. 09/783,217, filed Feb. 15, 2001, now U.S. Pat. No. 6,850,301 the entire content of which is hereby incorporated herein by reference in this application.

BACKGROUND OF THE INVENTION

The present invention relates to a liquid crystal display device. More specifically, the present invention relates to a liquid crystal display device having a wide viewing angle characteristic.

A liquid crystal display device is a flat display device with advantageous features such as a reduced thickness, a reduced weight, a reduced power consumption, etc. However, a problem of a liquid crystal display device is that the appearance of the displayed image varies depending upon the direction from which it is viewed, i.e., the "viewing angle dependency" is substantial. The substantial viewing angle dependency of a liquid crystal display device is primarily due to the fact that liquid crystal molecules having a uniaxial optical anisotropy are uniformly oriented in the display plane.

An effective method to improve the viewing angle characteristic of a liquid crystal display device is to produce a so-called "multi-domain orientation" by forming a plurality of regions of different orientations within a picture element region. Various methods have been proposed in the art to realize a multi-domain orientation. Typical methods, among others, for realizing a multi-domain orientation in a liquid crystal display device of a vertical alignment mode include those disclosed in Japanese Laid-Open Patent Publication No. 6-301036 and Japanese Laid-Open Patent Publication No. 11-258606.

Japanese Laid-Open Patent Publication No. 6-301036 discloses a method in which an opening is provided in a counter electrode which opposes a picture element electrode via a liquid crystal layer interposed therebetween so as to control the orientation direction of the liquid crystal molecules by utilizing the inclination (bending) of an electric field in the vicinity of the region where the opening is provided. An inclination of an electric field means the production of an electric field component parallel to the substrate plane (the plane of the liquid crystal layer). Therefore, the direction in which liquid crystal molecules having a negative dielectric anisotropy (which are in a vertical alignment in the absence of an applied voltage) are inclined in the presence of an applied voltage (i.e., the azimuth angle direction: the direction of the long axis of inclined liquid crystal molecules as it is projected onto the substrate surface) is defined by the electric field component parallel to the substrate plane. In other words, a component of an inclined electric field which is parallel to the substrate plane exerts an orientation-regulating force.

Japanese Laid-Open Patent Publication No. 11-258606 discloses that a multi-domain orientation can be obtained by forming a protrusion, a depression or a slit (an opening provided in an electrode) on one surface of each of a pair of substrates opposing each other via a liquid crystal layer interposed therebetween (e.g., a TFT substrate and a color filter substrate) which is closer to the liquid crystal layer. With either one of the methods disclosed in these publications, it is possible to realize a desirable viewing angle characteristic by using the method in combination with an appropriate optical compensation film.

However, a study conducted by the inventor of the present invention revealed that the techniques disclosed in the publications above have the following problems.

With the method of Japanese Laid-Open Patent Publication No. 6-301036, it is difficult to obtain a uniform multi-domain orientation. Moreover, when the value of the voltage applied across the liquid crystal layer is changed, it takes a relatively long time to complete the change in the orientation according to the change in the voltage value; that is, the response speed is slow. It is believed that these problems are caused by the fact that the orientation-regulating force for achieving a multi-domain orientation (a force for orienting the liquid crystal molecules in a particular direction) is relatively weak in this method.

The problems as described above do not occur with the method of Japanese Laid-Open Patent Publication No. 11-258606. It is believed that with this method, a sufficiently strong orientation-regulating force is obtained, thereby realizing a relatively stable multi-domain orientation. However, this method has the following problems.

First, if the method disclosed in this publication is employed, it is necessary to provide a protrusion, a depression or a slit on both of the pair of substrates interposing the liquid crystal layer therebetween in order to achieve a multi-domain orientation, thereby complicating the production process of the liquid crystal display device and lowering the production efficiency.

In a plasma-addressed liquid crystal display device (hereinafter, referred to as a "PALC"), a thin glass plate (which forms a part of a plasma cell substrate) having a thickness on the order of 10 µm and an area on the order of 1 $m^2$ is arranged on the side of the liquid crystal layer. Therefore, it is difficult to provide a protrusion or a depression on the surface of the plasma cell substrate which is closer to the liquid crystal layer. Moreover, although the thin glass plate itself functions as an electrode (it is sometimes called a "virtual electrode"), it is not an electrode made of a conductive layer, whereby a slit (an opening provided in an electrode) cannot be provided therein. Therefore, it is very difficult to use the method disclosed in this publication with PALCs.

With the method of this publication, the orientation-regulating force can be increased by miniaturizing an orientation region by narrowing the interval between adjacent protrusions, depressions or slits, which defines the orientation region. However, since the positional precision of the orientation regions depends directly upon the precision of the attachment of the substrates with each other, the orientation region cannot be miniaturized excessively.

SUMMARY OF THE INVENTION

In view of the above-mentioned conventional problems, the present invention has been devised for the purpose of realizing a liquid crystal display device with a desirable viewing angle characteristic which has a sufficiently stable orientation and a sufficiently high response speed and yet can be produced efficiently.

A liquid crystal display device of the present invention includes a first substrate, a second substrate and a liquid crystal layer interposed between the first substrate and the second substrate, wherein: a plurality of picture element regions are provided each of which is defined by a first electrode provided on one side of the first substrate which is closer to the liquid crystal layer and a second electrode provided on the second substrate so as to oppose the first electrode via the liquid crystal layer; the liquid crystal layer is a vertical alignment type liquid crystal layer containing a liquid crystal material having a negative dielectric anisotropy; and each of the plurality of picture element regions includes at least one orientation-regulating region, the orientation-regulating region including a first region in which an electric field applied across the liquid crystal layer by the first electrode and the second electrode has a first electric field strength, a second region in which the electric field has a second electric field strength which is smaller than the first electric field strength, and a third region in which the electric field has a third electric field strength which is smaller than the second electric field strength, wherein the first, second and third regions are arranged in this order in a predetermined direction. Thus, the object described above is achieved.

Alternatively, a liquid crystal display device of the present invention includes a first substrate, a second substrate and a liquid crystal layer interposed between the first substrate and the second substrate, wherein: a plurality of picture element regions are provided each of which is defined by a first electrode provided on one side of the first substrate which is closer to the liquid crystal layer and a second electrode provided on the second substrate so as to oppose the first electrode via the liquid crystal layer; the liquid crystal layer is a vertical alignment type liquid crystal layer containing a liquid crystal material having a negative dielectric anisotropy; and each of the plurality of picture element regions includes at least one orientation-regulating region, the orientation-regulating region including a first region in which the first electrode and the second electrode have a first inter-electrode distance therebetween, a second region in which the first electrode and the second electrode have a second inter-electrode distance therebetween which is greater than the first inter-electrode distance, and a third region in which the first electrode and the second electrode have a third inter-electrode distance therebetween which is greater than the second inter-electrode distance, wherein the first, second and third regions are arranged in this order in a predetermined direction. Thus, the object described above is achieved.

Alternatively, a liquid crystal display device of the present invention includes a first substrate, a second substrate and a liquid crystal layer interposed between the first substrate and the second substrate, wherein: a plurality of picture element regions are provided each of which is defined by a first electrode provided on one side of the first substrate which is closer to the liquid crystal layer and a second electrode provided on the second substrate so as to oppose the first electrode via the liquid crystal layer; the liquid crystal layer is a vertical alignment type liquid crystal layer containing a liquid crystal material having a negative dielectric anisotropy; the first electrode includes a lower conductive layer, a dielectric layer covering the lower conductive layer, and an upper conductive layer provided on one side of the dielectric layer which is closer to the liquid crystal layer; the upper conductive layer includes an upper layer opening for each of the plurality of picture element regions, and the lower conductive layer includes a lower layer opening for each of the plurality of picture element regions; and each of the plurality of picture element regions includes at least one orientation-regulating region, the orientation-regulating region including a first region in which the liquid crystal layer is arranged between the upper conductive layer of the first electrode and the second electrode, a second region in which the liquid crystal layer and the dielectric layer located within the upper layer opening are arranged between the lower conductive layer of the first electrode and the second electrode, and a third region in which the liquid crystal layer and the dielectric layer located within the upper layer opening are arranged between the lower layer opening of the first electrode and the second electrode, wherein the first, second and third regions are arranged in this order in a predetermined direction. Thus, the object described above is achieved.

Preferably, each of the upper layer opening and the lower layer opening has a side extending in a direction perpendicular to the predetermined direction, and a boundary between the first region and the second region and a boundary between the second region and the third region extend along the side.

Preferably, a boundary between the first region and the second region and a boundary between the second region and the third region extend in a direction perpendicular to the predetermined direction.

Preferably, in each of the plurality of picture element regions, one surface of the first substrate which is closer to the liquid crystal layer is substantially flat.

Preferably, in each of the plurality of picture element regions, the liquid crystal layer has a substantially constant thickness.

Each of the plurality of picture element regions may include a plurality of orientation-regulating regions, the plurality of orientation-regulating regions having the same direction of arrangement of the first, second and third regions.

Preferably, each of the plurality of picture element regions includes a first orientation-regulating region in which the first, second and third regions are arranged in this order in a first direction, and a second orientation-regulating region in which the first, second and third regions are arranged in this order in a second direction which is different from the first direction.

Each of the plurality of picture element regions may include a plurality of at least one of the first orientation-regulating region and the second orientation-regulating region.

The first direction and the second direction may be opposite to each other.

More preferably, each of the plurality of picture element regions further includes a third orientation-regulating region in which the first, second and third regions are arranged in this order in a third direction which is different from the first and second directions, and a fourth orientation-regulating region in which the first, second and third regions are arranged in this order in a fourth direction which is different from the first, second and third directions, wherein the third and fourth directions are perpendicular to the first and second directions.

Preferably, the first orientation-regulating region and the second orientation-regulating region share at least one of the first region and the third region.

Each of the upper layer opening and the lower layer opening may have a polygonal shape or a circular shape, with the lower layer opening being located within the upper layer opening. In such a case, the center of gravity of the upper layer opening and that of the lower layer opening preferably coincide with each other in the substrate plane. While the shape of the upper layer opening and that of the lower layer opening may differ from each other, they are preferably similar to each other.

The first electrode may be a picture element electrode which is provided for each of the plurality of picture element regions, and a voltage may be applied to the first electrode via an active element which is provided for each of the plurality of picture element regions.

The second electrode may be a single counter electrode which is provided commonly for the plurality of picture element regions.

The plurality of picture element regions may be arranged in a matrix pattern having rows and columns; the first electrode may be provided as a plurality of electrodes which are arranged in a stripe pattern corresponding to the columns; and the second substrate may include a thin dielectric plate, an insulative substrate, and a plurality of plasma channels which are arranged in a stripe pattern corresponding to the rows between the thin dielectric plate and the insulative substrate, and the second electrode may be provided as a plurality of virtual electrodes respectively formed by corresponding regions of the thin dielectric plate respectively opposing the plurality of plasma channels which are arranged in a stripe pattern.

The upper conductive layer and the lower conductive layer may be electrically connected to each other.

The functions of the present invention will now be described.

A liquid crystal display device of a vertical alignment mode according to the present invention includes a first electrode and a second electrode which apply a voltage across liquid crystal molecules having a negative dielectric anisotropy (which are vertically aligned in the absence of an applied voltage). The orientation direction of the liquid crystal molecules changes in each picture element region according to an electric field which is produced in a liquid crystal layer by the voltage applied between the first electrode and the second electrode, thereby displaying an image.

Each of the plurality of picture element regions includes at least one orientation-regulating region, the orientation-regulating region including a first region in which an electric field applied across the liquid crystal layer by the first electrode and the second electrode has a first electric field strength, a second region in which the electric field has a second electric field strength which is smaller than the first electric field strength, and a third region in which the electric field has a third electric field strength which is smaller than the second electric field strength, wherein the first, second and third regions are arranged in this order in a predetermined direction.

Such first, second and third regions can be provided by setting different inter-electrode distances between the first electrode and the second electrode, for example. The electric field strength distribution as described above can be realized by employing a structure where the orientation-regulating region of each of the plurality of picture element regions includes a first region in which the first electrode and the second electrode have a first inter-electrode distance therebetween, a second region in which the first electrode and the second electrode have a second inter-electrode distance therebetween which is greater than the first inter-electrode distance, and a third region in which the first electrode and the second electrode have a third inter-electrode distance therebetween which is greater than the second inter-electrode distance. The inter-electrode distance of a region refers to the distance between a pair of electrodes in the region which substantially determines the strength of the electric field produced therebetween. A picture element region having such an inter-electrode distance distribution can be realized by employing the following structure, for example.

The first electrode includes, for each picture element region, a lower conductive layer, a dielectric layer covering the lower conductive layer, and an upper conductive layer provided on one side of the dielectric layer which is closer to the liquid crystal layer. The upper conductive layer includes an upper layer opening, and the lower conductive layer includes a lower layer opening. The upper conductive layer and the lower conductive layer are arranged so as to provide a first region in which the liquid crystal layer in the picture element region is arranged between the upper conductive layer of the first electrode and the second electrode (this interval defines the first inter-electrode distance), a second region in which the liquid crystal layer and the dielectric layer located within the upper layer opening are arranged between the lower conductive layer of the first electrode and the second electrode (this interval defines the second inter-electrode distance), and a third region in which the liquid crystal layer and the dielectric layer located within the upper layer opening are arranged between the lower layer opening of the first electrode and the second electrode (this interval defines the third inter-electrode distance). Thus, in this structure, the distance between the upper conductive layer (a region excluding the upper layer opening) and the second electrode defines the first inter-electrode distance, and the distance between the lower conductive layer (a region excluding the lower layer opening) and the second electrode defines the second inter-electrode distance. The third inter-electrode distance is defined by the distance between the opening of the first electrode (a portion where the upper layer opening and the lower layer opening overlap with each other and where no conductive layer is formed) and the second electrode, whereby the third inter-electrode distance is infinite.

The inter-electrode distance as used herein is as described above, and when at least one of a pair of opposing electrodes has an opening (a region where no conductive film exists), the inter-electrode distance of the region corresponding to the opening is infinite. The "first electrode" and the "second electrode" as used herein are electrodes which define a picture element region, and are members having a function of producing an electric field in the liquid crystal layer so as to change the orientation of the liquid crystal layer, thereby producing a display. Each of the "first electrode" and the "second electrode" may include not only a single conductive layer but also a plurality of conductive layers separated from one another by a dielectric layer. Moreover, each conductive layer may include an opening.

The functions of a liquid crystal display device of the present invention will be described by illustrating, for example, an orientation-regulating region formed by the first electrode (having the upper conductive layer and the lower conductive layer) and the second electrode.

The strength of an electric field produced in the liquid crystal layer of the first region is directly influenced primarily by the potential difference between the upper conductive layer and the second electrode, and the strength of an electric field produced in the liquid crystal layer of the second region is directly influenced by the potential difference of a liquid crystal layer portion which is obtained by division (primarily capacitance division) of the potential difference between the lower conductive layer and the second electrode by the dielectric layer and the liquid crystal layer. Therefore, the strength of the electric field applied across the liquid crystal layer by the first electrode and the second electrode can be easily made smaller in the second region than in the first region. As a result, in the vicinity of the boundary between the first region and the second region, an inclination (bending) of an electric field occurs. As described above, an inclination of an electric field means the production of an electric field component parallel to the substrate plane (the plane of the liquid crystal layer), and the component parallel to the substrate plane exerts an orientation-regulating force. Thus, an orientation-regulating force occurs in the vicinity of the boundary between the first region and the second region. The above-described relationship can be realized with, for example, a simple structure where the upper conductive layer and the lower conductive layer are electrically connected to each other.

The liquid crystal layer of the third region is located between the lower layer opening located within the upper layer opening and the second electrode, and there are no electrodes (conductive layers) opposing each other which would produce an electric field directly across the liquid crystal layer of the third region, whereby the liquid crystal layer of the third region is influenced by an electric field from other regions of electrodes (conductive layers) existing around the third region. Therefore, the strength of the electric field to be applied across the liquid crystal layer of the third region is smaller than the strength of the electric field to be applied across the liquid crystal layer of surrounding regions. As a result, an inclination (bending) of an electric field occurs also in the vicinity of the boundary between the second region and the third region, thereby producing an orientation-regulating force also in the vicinity of the boundary between the second region and the third region. Since the first, second and third regions are arranged in a single direction, the direction of the orientation-regulating force occurring in the vicinity of the boundary between the first region and the second region and that occurring in the vicinity of the boundary between the second region and the third region are the same, whereby a substantial orientation-regulating force occurs also in the second region which exists between these boundaries. Of course, the direction of the orientation-regulating force substantially occurring in the second region is the same as that of the orientation-regulating force in the vicinity of these two boundary regions. Thus, the first, second and third regions, arranged in a single direction as a set, serve as a single orientation-regulating region, wherein the orientation direction of the liquid crystal molecules which are regulated by the orientation-regulating region is the direction of arrangement of the first, second and third regions.

At least one orientation-regulating region is provided for each picture element region, and in the orientation-regulating region, the first, second and third regions are arranged in this order in a predetermined direction. Therefore, the strength of an electric field produced in the liquid crystal layer gradually decreases in the predetermined direction. An inclined electric field is produced between the first region and the second region, and an inclined electric field is produced between the second region and the third region, wherein these inclined electric fields have the same inclination direction in the predetermined direction. Therefore, the liquid crystal molecules of the liquid crystal layer in the orientation-regulating region change the orientation direction thereof so that they are inclined in a single direction in the presence of an applied voltage. As a result, it is possible to obtain a sufficiently stable orientation and a sufficiently high response speed. Moreover, this function can be obtained by changing the structure of only the first electrode. Therefore, the present invention does not complicate the production process and can easily be used with various types of liquid crystal display devices. The predetermined direction in which the liquid crystal molecules in the orientation-regulating region are inclined can be suitably set according to the viewing angle characteristic which is required for the liquid crystal display device.

The functions of the present invention have been described in the above with respect to a structure where the orientation-regulating region includes first, second and third regions. Of course, these functions can be obtained if the orientation-regulating region includes at least the first, second and third regions, and the orientation-regulating region may further include a fourth region, a fifth region, and so on, as necessary. The fourth region is a region with a fourth electric field strength which is smaller than the third electric field strength of the third region, and the fifth region is a region with a fifth electric field strength which is even smaller than the fourth electric field strength. The fourth region and the fifth region are arranged in this order in the predetermined direction, following the third region. Thus, the first, second, third, fourth and fifth regions, arranged in a single direction as a set, serve as a single orientation-regulating region, wherein the orientation direction of the liquid crystal molecules which are regulated by the orientation-regulating region is the direction of arrangement of the first to fifth regions.

For example, the fourth region has a fourth inter-electrode distance which is greater than the third inter-electrode distance, and the fifth region has a fifth inter-electrode distance which is greater than the fourth inter-electrode distance. Specifically, for example, a further dielectric layer is provided under the lower conductive layer (on the substrate side) of the first electrode, and a conductive layer (referred to as the "additional conductive layer") having an opening (referred to as the "additional opening") is provided under the further dielectric layer. The additional conductive layer is arranged so that the opening of the additional conductive layer is located within the lower layer opening of the lower conductive layer. In such a structure, a region of the liquid crystal layer which is located between a conductive portion of the additional conductive layer (i.e., a portion thereof excluding the additional opening) and the second electrode (this interval defines the fourth inter-electrode distance) serves as the fourth region, and a region of the liquid crystal layer which is located between the additional opening of the additional conductive layer and the second electrode (this interval defines the fifth inter-electrode distance, which in this example infinite) serves as the fifth region. Alternatively, the third region can be formed by providing a dielectric layer under the lower layer opening defining the third region and further providing a conductive layer having no opening under this dielectric layer (that is, the third inter-electrode distance, which is infinite in the above example, may be finite). This structure is preferred because all regions of the liquid crystal layer are sandwiched by conductive layers, whereby the electric field produced in the liquid crystal layer is less likely affected by an external influence.

Preferably, the boundary between the first region and the second region and the boundary between the second region and the third region extend in a direction perpendicular to the predetermined direction. For example, if one employs a structure where each of the upper layer opening and the lower layer opening has a side extending in a direction perpendicular to the predetermined direction, and the boundary between the first region and the second region and the boundary between the second region and the third region extend in parallel to the side of the upper layer opening and the lower layer opening, the directions of the inclined electric fields produced around the respective region boundaries coincide with each other also in terms of the azimuth angle direction (the direction in the display plane), thereby increasing the orientation-regulating effect.

The orientation-regulating region can be formed by changing the structure of one of the pair of electrodes opposing each other via the liquid crystal layer (i.e., the first electrode). Therefore, the surface of the first substrate (the substrate on which the first electrode is formed) which is closer to the liquid crystal layer can be made substantially flat in each of the picture element regions. In other words, it is not necessary to provide a protrusion or a depression for defining the orientation direction of the liquid crystal molecules. Moreover, the thickness of the liquid crystal layer in the picture element regions can be made substantially constant. Therefore, the orientation-regulating region according to the present invention can be easily used with various types of liquid crystal display devices, and does not complicate the production process.

It is possible to reduce the area of each orientation-regulating region by providing in each picture element region a plurality of orientation-regulating regions which regulate the orientation direction of the liquid crystal molecules in the same direction. Thus, it is possible to improve the response speed of a mono-domain-orientation picture element region.

For improving the viewing angle characteristic, it is preferred to provide in each picture element region a plurality of orientation-regulating regions which regulate the orientation direction of the liquid crystal molecules in directions different from one another, thereby forming a multi-domain orientation. In such a case, it is possible to reduce the area of each orientation-regulating region by providing a plurality of orientation-regulating regions which regulate the orientation direction of the liquid crystal molecules in the same direction. Thus, it is possible to improve the response speed of the picture element region of a multi-domain orientation.

The plurality of orientation-regulating regions preferably include orientation-regulating regions where the directions in which the liquid crystal molecules are oriented by the orientation-regulating regions (such a direction is also referred to as the orientation direction, the inclination direction or the orientation axis of the orientation-regulating region) are opposite to each other. When a plurality of orientation-regulating regions are provided for each picture element region, it is preferred that the orientation-regulating regions have opposite inclination directions of liquid crystal molecules, so that the respective viewing angle dependencies of the orientation-regulating regions can be compensated for by each other, thereby efficiently improving the viewing angle characteristic.

Moreover, it is possible to obtain an even more symmetrical viewing angle characteristic by providing four or more orientation-regulating regions having different inclination directions (orientation axes). Particularly, it is possible to obtain a liquid crystal display device having a high light efficiency in addition to the highly symmetrical viewing angle characteristic, by providing four orientation-regulating regions respectively having four different inclination directions (orientation axes) so that any two inclination directions selected from among the four inclination directions have an angle which is an integral multiple of about 90° with respect to each other.

When a plurality of orientation-regulating regions which regulate the orientation direction of the liquid crystal molecules in different directions are provided in each picture element region (i.e., in the case of a multi-domain orientation), it is preferred to arrange the plurality of orientation-regulating regions so that at least two of the orientation-regulating regions share the first and second regions so as to obtain a display with a high light efficiency (i.e., a bright display).

Each of the first region and the third region is provided for the purpose of inclining the electric field along the boundary between that region and the second region, i.e., to obtain an orientation-regulating force therebetween. The second region is a region in which the liquid crystal molecules are oriented substantially uniformly due to this orientation-regulating force, thereby obtaining a substantially uniform amount of transmitted light across the region. Generally, in a liquid crystal display device, if one employs a structure with which a uniform amount of transmitted light can be obtained across the entire picture element region (e.g., a TN type liquid crystal display device), it is possible to obtain the maximum light efficiency (the highest transmittance) for the picture element region as a whole (or for the display region of the liquid crystal display device as a whole). Thus, in the case of a liquid crystal display device of the present invention, it is preferred in terms of the light efficiency that the area of the entire picture element region which is occupied by the second region (where a uniform amount of transmitted light can be obtained) is increased as much as possible, thereby increasing the light efficiency. Accordingly, in order to increase the light efficiency, it is preferred that the area of the entire picture element region which is occupied by the first and third regions is reduced as much as possible within such an extent that a desired orientation-regulating force can be obtained so as to increase as much as possible the area occupied by the second region.

It is possible to reduce the area of a picture element region occupied by the first region and the third region by arranging the plurality of orientation-regulating regions so that the orientation-regulating regions share at least one of the first region and the third region. Thus, it is possible to improve the light efficiency. When two types of orientation-regulating regions respectively having orientation-regulating directions opposite to each other (different from each other by 180°) are arranged in an alternating pattern, the first region and the third region can be shared around boundaries between the orientation-regulating regions. The first region and the third region can be shared because the electric field inclination directions, i.e., the orientation-regulating directions, are opposite to each other(different from each other by 180°) between the two boundaries respectively between the first region and the second region and between the third region and the second region.

It is possible to improve the viewing angle characteristic also by orienting the liquid crystal molecules in an axial symmetry. It is possible to obtain a stable axially symmetrical orientation for example by providing an upper layer opening and a lower layer opening each having a polygonal shape or a circular shape, with the lower layer opening being provided within the upper layer opening. When employing a polygonal shape for the openings, it is preferred to employ a regular polygon in terms of the symmetry. However, it is possible to realize a substantially axially symmetrical orientation with an irregular polygon by selecting the irregular polygon according to the shape of the picture element region, etc.

A sufficient response speed and viewing angle characteristic may be obtained even when a mono-domain structure is employed for each picture element region. Since the display signals of adjacent picture element regions are correlated with each other, it is possible to improve the viewing angle characteristic when the orientation directions of the orientation-regulating regions are different from each other (preferably perpendicular to each other) between adjacent picture element regions. In the case of a color display device, this can be achieved by employing different orientation directions for adjacent pixel regions, each pixel region being comprised of R, G and B picture element regions. If a picture element region is small, it is possible to achieve a sufficient response speed by providing one orientation-regulating region therein. Moreover, as described above, it is possible to improve the response speed of a mono-domain-orientation picture element region by forming a plurality of orientation-regulating regions therein which regulate the liquid crystal molecules in the same direction.

The electrode structure including at least two conductive layers (each having openings therein) with a dielectric layer interposed therebetween can be used for either the picture element electrodes or the counter electrode of an active matrix type liquid crystal display device. Moreover, the electrode structure can also be used for the signal electrodes in a PALC which are arranged to oppose the plasma channels via a liquid crystal layer interposed therebetween. Thus, the electrode structure can be widely used with known liquid crystal display devices.

DETAILED DESCRIPTION OF THE INVENTION

Hereinafter, preferred embodiments of the present invention will be described with reference to the accompanying drawings. First, the electrode structure of the liquid crystal display device of the present invention and the function thereof will be described.

In the present specification, a region of a liquid crystal display device corresponding to a "picture element", which is the minimum unit of display, will be referred to as a "picture element region". In a color liquid crystal display device, R, G and B "picture elements" correspond to one "pixel". In an active matrix type liquid crystal display device, a picture element region is defined by a picture element electrode and a counter electrode which opposes the picture element electrode. In a PALC, a picture element region is defined as a region where one of column electrodes which are arranged in a stripe pattern crosses one of plasma channels which are also arranged in a stripe pattern perpendicular to the column electrodes. In an arrangement with a black matrix, strictly speaking, a picture element region is a portion of each region across which a voltage is applied according to the intended display state which corresponds to an opening of the black matrix.

Figure 1A:
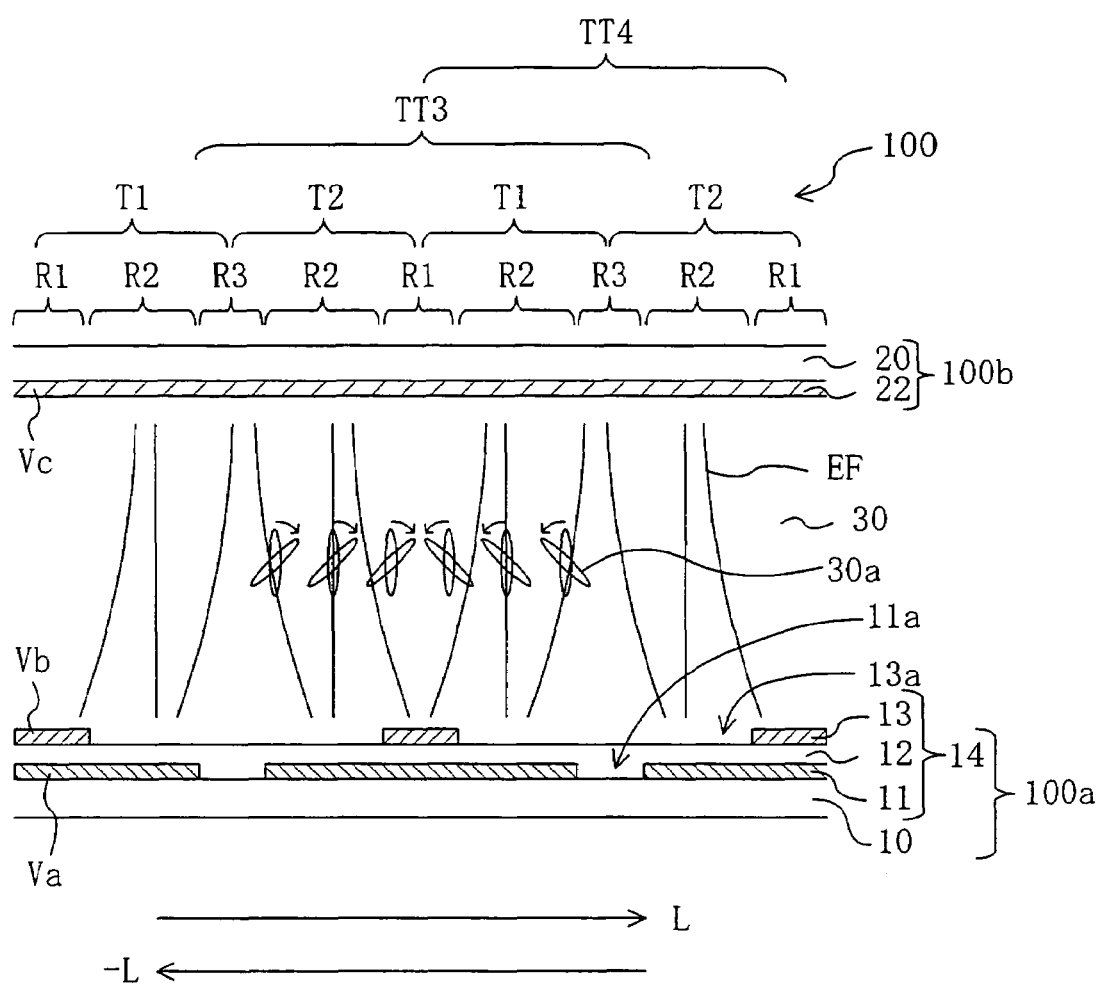
FIG. 1A is a diagram schematically illustrating a cross-sectional structure of a liquid crystal display device 100 of one embodiment of the present invention along with electric force lines.
Figure 1B:
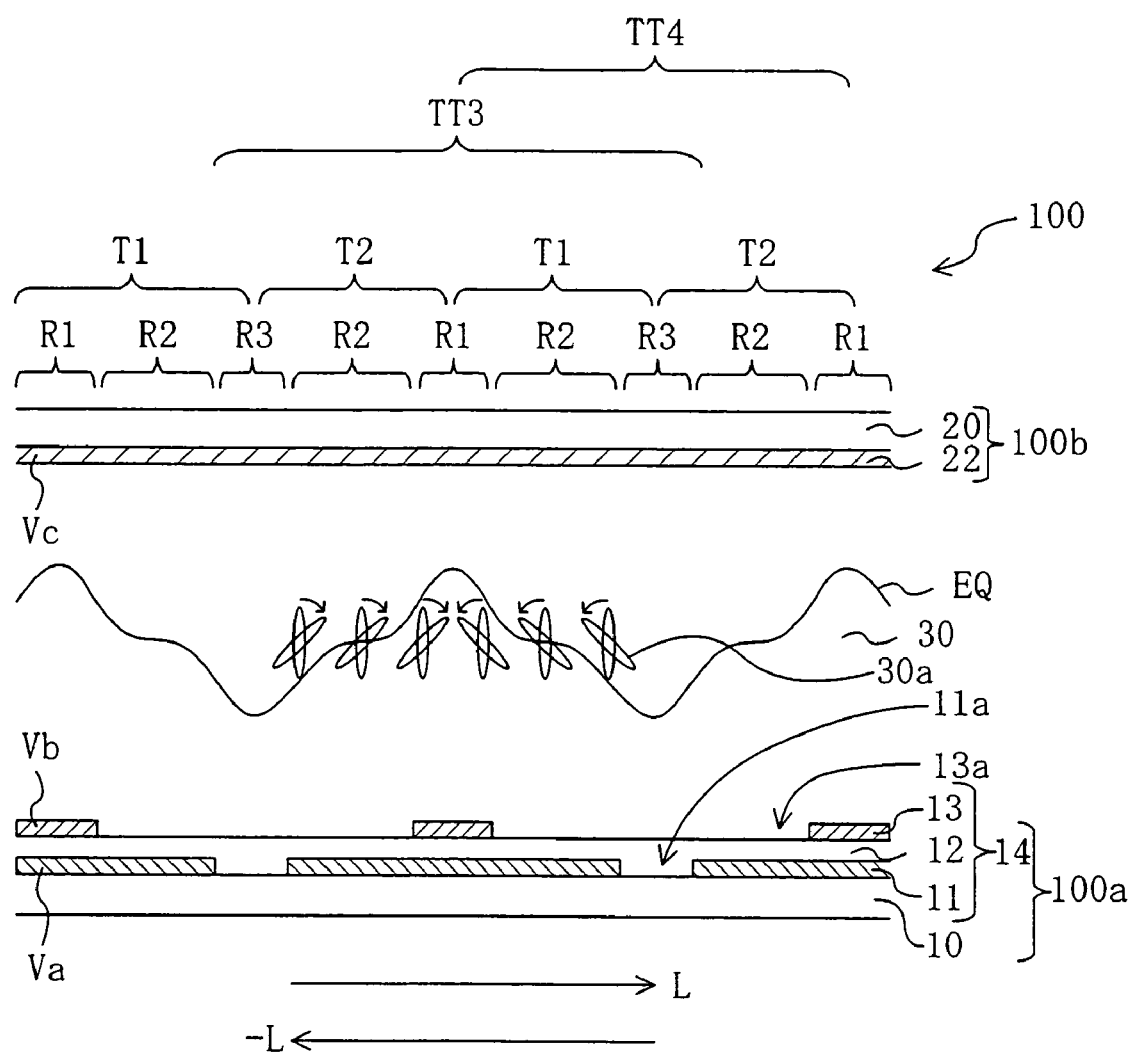
FIG. 1B is a diagram schematically illustrating the cross-sectional structure of the liquid crystal display device 100 of one embodiment of the present invention along with an equipotential line.
Figure 1C:
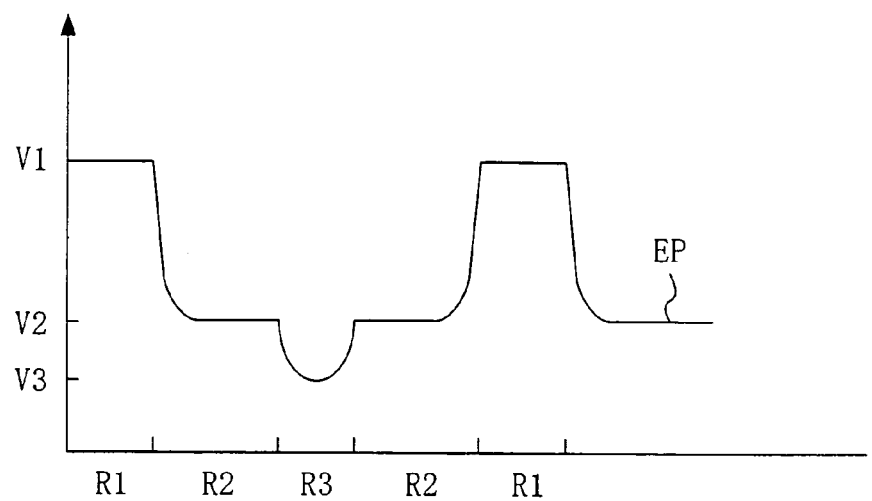
FIG. 1C is a diagram schematically illustrating a potential distribution produced in the vicinity of the interface between a liquid crystal layer and a first electrode of the liquid crystal display device 100 of one embodiment of the present invention.
Figure 1D:
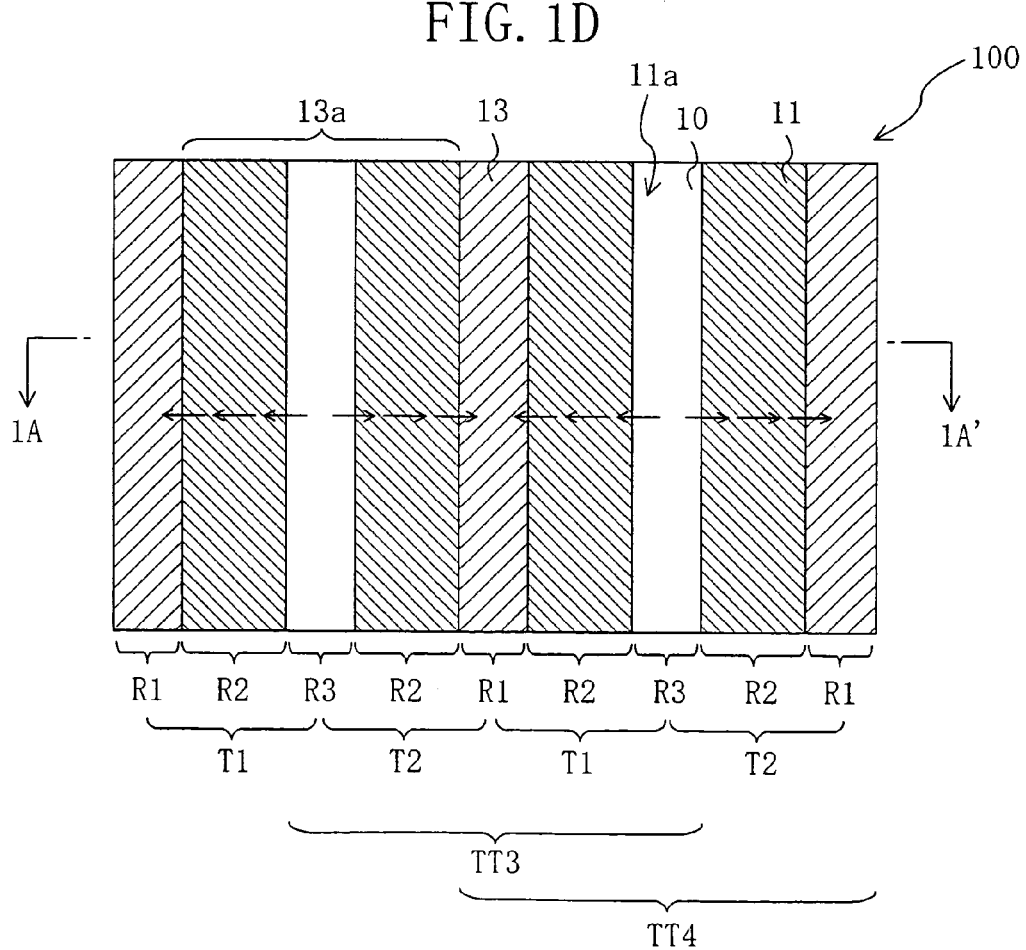
FIG. 1D is a plan view schematically illustrating the liquid crystal display device 100 of one embodiment of the present invention.

A liquid crystal display device 100 of one embodiment of the present invention will be described with reference to FIG. 1A, FIG. 1B, FIG. 1C and FIG. 1D. FIG. 1A and FIG. 1B are cross-sectional views of the liquid crystal display device 100, and FIG. 1D is a plan view thereof. FIG. 1A and FIG. 1B are cross-sectional views both taken along line 1A-1A' of FIG. 1D. FIG. 1C schematically illustrates the potential distribution produced in the liquid crystal layer of the liquid crystal display device 100.

In the following description, the color filter and the black matrix are omitted for the sake of simplicity. In subsequent figures, each element having substantially the same function as that of the liquid crystal display device 100 will be denoted by the same reference numeral and will not be further described.

The liquid crystal display device 100 includes a first substrate (e.g., an active matrix substrate) 100a, a second substrate (e.g., a counter substrate) 100b, and a liquid crystal layer 30 provided between the first substrate 100a and the second substrate 100b. Liquid crystal molecules 30a of the liquid crystal layer 30 have a negative dielectric anisotropy, and are oriented by a vertical alignment layer (not shown), which is provided on one surface of each of the first substrate 100a and the second substrate 100b which is closer to the liquid crystal layer 30, in a vertical alignment with respect to the surface of the vertical alignment layer in the absence of an applied voltage across the liquid crystal layer 30. Since the surface of the vertical alignment layer is substantially parallel to the surfaces of the substrates 100a and 100b, the liquid crystal molecules 30a are also referred to as being "vertical to the substrate surface". In the present specification, the liquid crystal layer 30 in the absence of an applied voltage is referred to as being in a "vertical alignment", and the liquid crystal layer 30 is referred to as a "vertical alignment type liquid crystal layer". However, the liquid crystal molecules 30a of the liquid crystal layer 30 in the vertical alignment may be slightly inclined from the normal to the surface of the vertical alignment film (the substrate surface) depending upon the type of the vertical alignment film or the type of the liquid crystal material being used. Generally, the vertical alignment refers to a state where the liquid crystal molecular axis is oriented at an angle of about 85° or more with respect to the surface of the vertical alignment film.

The first substrate 100a of the liquid crystal display device 100 includes a transparent substrate (e.g., a glass substrate) 10 and a first electrode (e.g., a picture element electrode) 14 which is formed on the surface thereof. The second substrate 100b includes a transparent substrate (e.g., a glass substrate)

20 and a second electrode (e.g., a counter electrode) 22 which is formed on the surface thereof. The orientation of the liquid crystal layer 30 changes for each picture element region according to the voltage applied thereacross between the first electrode 14 and the second electrode 22 which are arranged so as to oppose each other via the liquid crystal layer 30. A display is produced by utilizing a phenomenon that the polarization of light having passed through the liquid crystal layer 30 changes along with the change in the orientation of the liquid crystal layer 30.

The first electrode 14 of the liquid crystal display device 100 includes a lower conductive layer 11, a dielectric layer 12 covering the lower conductive layer 11, and an upper conductive layer 13 provided on one side of the dielectric layer 12 which is closer to the liquid crystal layer 30. The lower conductive layer 11 includes a lower layer opening 11a, and the upper conductive layer 13 includes an upper layer opening 13a. They are arranged so that the lower layer opening 11a is located within the upper layer opening 13a. The lower layer opening 11a and the upper layer opening 13a each refer to a portion of the respective conductive layers where a conductive film is not formed.

For the sake of simplicity, the second electrode 22 is herein assumed to be a single film of a conductive material (having no opening within a picture element region) which is formed across the entirety of one picture element region. However, the second electrode 22, having such a structure as described above and opposing the first electrode 14, is not required to have any special structure for obtaining the effects of the present invention, and may be one which has a known electrode structure.

The two-dimensional arrangement of the first electrode 14 and the second electrode 22 in the display plane will be described. The upper layer opening 13a of the upper conductive layer 13 is formed so as to include therein the lower layer opening 11a of the lower conductive layer 11. Thus, as illustrated in FIG. 1D, the upper layer opening 13a has a width (length in the lateral direction of the figure) which is greater than that of the lower layer opening 11a. Preferably, the upper layer opening 13a and the lower layer opening 11a have sides parallel to each other, and the lower layer opening 11a is arranged to be located in the center of the upper layer opening 13a in the width direction thereof.

The first electrode 14 and the second electrode 22 arranged as described above form regions therebetween having different structures. Specifically, the liquid crystal display device 100 includes a first region R1 in which the liquid crystal layer 30 is arranged between the upper conductive layer 13 and the second electrode 22, a second region R2 in which the liquid crystal layer 30 and the dielectric layer 12 located within the upper layer opening 13a are arranged between the lower conductive layer 11 and the second electrode 22, and a third region R3 in which the liquid crystal layer 30 and the dielectric layer 12 located within the upper layer opening 13a are arranged between the lower layer opening 11a and the second electrode 22.

In the present embodiment, orientation-regulating regions T1 and orientation-regulating regions T2 are arranged in an alternating pattern. In the orientation-regulating region T1, the first region R1, the second region R2 and the third region R3 are arranged in this order in a direction L in FIG. 1A and FIG. 1B. In the orientation-regulating region T2, the regions R1, R2 and R3 are arranged in this order in a direction −L (opposite to the direction L). The first region R1 and the third region R3 are arranged so that they are shared by the orientation-regulating region T1 and the orientation-regulating region T2 adjacent to each other.

The function of the electrode structure of the liquid crystal display device 100 will be described with reference to FIG. 1A, FIG. 1B and FIG. 1C.

FIG. 1A schematically illustrates an electric force line EF of an electric field produced in the liquid crystal layer 30 of the liquid crystal display device 100 in the presence of an applied voltage, along with the change in the orientation direction of the liquid crystal molecules 30a. FIG. 1B schematically illustrates an equipotential line EQ (the cross section of the equipotential surface) of an electric field produced through the liquid crystal layer 30 in the presence of an applied voltage, along with the change in the orientation direction of the liquid crystal molecules 30a. It is assumed that the absolute value of the voltage is greater than the absolute value of the threshold voltage. Generally, in the present invention, an orientation-regulating force from an electric field can be obtained if the relationship $Vb \leq Va < Vc$ or $Vb \geq Va > Vc$ is satisfied, wherein Va denotes the potential applied to the lower conductive layer 11 of the first electrode 14, Vb denotes the potential applied to the upper conductive layer 13 of the first electrode 14, and Vc denotes the potential applied to the second electrode 22. A case where a positive voltage is applied to the first electrode 14 will be described below while assuming that the second electrode 22 is at the ground potential for the sake of simplicity. It is also assumed that an equal potential is applied to the lower conductive layer 11 and the upper conductive layer 13 of the first electrode 14.

The strength of an electric field produced in the liquid crystal layer 30 of the first region R1 is directly influenced primarily by the potential difference between the upper conductive layer 13 and the second electrode 22, and the strength of an electric field produced in the liquid crystal layer 30 of the second region R2 is directly influenced by the potential difference which is obtained by division (primarily capacitance division) of the potential difference between the lower conductive layer 11 and the second electrode 22 by the dielectric layer 12 and the liquid crystal layer 30. Therefore, the potential difference applied across the liquid crystal layer 30 by the first electrode 14 and the second electrode 22 is smaller in the second region R2 than in the first region R1, whereby the electric field produced in the liquid crystal layer 30 in the vicinity of the boundary between the second region R2 and the first region R1 is inclined.

There are no electrodes (conductive layers) opposing each other which would produce an electric field directly through the liquid crystal layer 30 of the third region R3, whereby the liquid crystal layer 30 of the third region R3 is influenced by an electric field from other regions of electrodes (conductive layers) existing around the third region R3. Therefore, the strength of the electric field to be applied across the liquid crystal layer 30 of the third region R3 is smaller than the strength of the electric field to be applied across the liquid crystal layer 30 of the regions R2 existing around the third region R3, whereby the electric field produced in the liquid crystal layer 30 in the vicinity of the boundary between the second region R2 and the first region R1 is inclined.

As a result, the electric field (electric force line EF) produced in the orientation-regulating region T1 or T2 of the liquid crystal layer 30 of the liquid crystal display device 100 is inclined in the vicinity of the boundary between the first region R1 and the second region R2 and in the vicinity of the boundary between the second region R2 and the third region R3 as illustrated in FIG. 1A. The inclination direction is in the direction in which the first region R1, the second region R2 and the third region R3 are arranged in this order. Specifically, the electric field is inclined leftward in the orientation-regulating region T1 and rightward in the orientation-regulating region T2. The liquid crystal molecules 30a having a negative dielectric anisotropy are subject to, in the electric field, a torque such as to orient the molecular axis vertically to the direction of the electric field (electric force line EF), whereby the liquid crystal molecules 30a are inclined in the vicinity of the boundary between the first region R1 and the second region R2 and in the vicinity of the boundary between the second region R2 and the third region R3 according to the directions of the respective inclined electric fields (see arrows in FIG. 1A, FIG. 1B and FIG. 1D). The liquid crystal molecules 30a are inclined counterclockwise in the first orientation-regulating region T1 and clockwise in the second orientation-regulating region T2.

An electric field substantially vertical to the substrate is produced in the vicinity of the center of the second region R2 located between the first region R1 and the third region R3. Therefore, the liquid crystal molecules 30a present in this region are not subject to a torque from an electric field which would incline the liquid crystal molecules 30a in a particular direction. However, the second region R2 is provided between the first region R1 and the third region R3, and the direction of the produced inclined electric field is the same in the vicinity of the boundary between the first region R1 and the second region R2 and in the vicinity of the boundary between the second region R2 and the third region R3, whereby the liquid crystal molecules 30a therein are accordingly inclined in the same direction. Therefore, the liquid crystal molecules present in the vicinity of the center of the second region R2 are influenced by the change in the orientation of the liquid crystal molecules 30a in the vicinity of the boundaries so as to be inclined in the same direction. In other words, the liquid crystal molecules 30a in the vicinity of the boundary between the second region R2 and the first region R1 and those in the vicinity of the boundary between the second region R2 and the third region R3 (which influence the orientation direction (inclination direction) of the liquid crystal molecules 30a present in the vicinity of the center of the second region R2 in which the inclination direction is not uniquely regulated by an electric field) are both inclined in the same direction. As a result, all of the liquid crystal molecules 30a are stably inclined in the same direction within each orientation-regulating region.

FIG. 1C is a diagram schematically illustrating the potential distribution along the boundary between the first electrode 14 and the liquid crystal layer 30. The vertical axis denotes the potential, and the horizontal axis corresponds to the position in FIG. 1A or FIG. 1D. Assuming that the potential of the second electrode 22 is zero (ground potential), the value of a voltage to be applied across the liquid crystal layer 30 in each region is equal to the value of the potential of that region as illustrated in FIG. 1C. Thus, the voltages applied across the liquid crystal layer 30 in the respective regions, the first region R1, the second region R2 and the third region R3, have values of V1, V2 and V3, respectively. Therefore, as illustrated in FIG. 1C, the voltage V2 applied across the liquid crystal layer 30 of the second region R2 is lower than the voltage V1 applied across the liquid crystal layer 30 of the first region R1, and the voltage V3 applied across the third region R3 is even lower than the voltage V2 applied across the second region R2. Therefore, the electric field produced in the orientation-regulating region T1 or T2 as represented by the equipotential line EQ is a curve which repeatedly goes up and down in a stepped manner as illustrated in FIG. 1B.

The equipotential line EQ illustrated in FIG. 1B is inclined where adjacent regions have different potentials, i.e., in the vicinity of the boundary between the first region R1 and the second region R2 and in the vicinity of the boundary between the second region R2 and the third region R3. The direction of the potential gradient is in the direction in which the first region R1, the second region R2 and the third region R3 are arranged in this order (see, for example, arrows in FIG. 1D). The liquid crystal molecules 30a having a negative dielectric anisotropy are subject to a torque from an electric field such that the molecular axis is oriented in parallel to the equipotential line EQ. Therefore, in a region having such a potential gradient as described above, the liquid crystal molecules 30a are inclined in the direction of the potential gradient.

As the area (length in a cross-sectional view) of the second region R2 increases, there may be a region with no potential gradient in the vicinity of the center of the second region R2. (this is indicated by vertical electric force lines EF in FIG. 1A). The liquid crystal molecules 30a in this region are not subject to a torque from an electric field which would incline the liquid crystal molecules 30a in a particular direction. However, the second region R2 is provided between the first region R1 and the third region R3, and the liquid crystal molecules 30a are inclined in the same direction according to the direction of the produced potential gradient in the vicinity of the boundary between the first region R1 and the second region R2 and in the vicinity of the boundary between the second region R2 and the third region R3. Therefore, the liquid crystal molecules present in the vicinity of the center of the second region R2 are influenced by the change in the orientation of the liquid crystal molecules 30a in the vicinity of the boundaries so as to be inclined in the same direction. In other words, the liquid crystal molecules 30a in the vicinity of the boundary between the second region R2 and the first region R1 and those in the vicinity of the boundary between the second region R2 and the third region R3 (which influence the orientation direction (inclination direction) of the liquid crystal molecules 30a present in the vicinity of the center of the second region R2 in which the inclination direction is not uniquely regulated by an electric field) are both inclined in the same direction. As a result, all of the liquid crystal molecules 30a are stably inclined in the same direction within each orientation-regulating region T1 or T2.

The greater is the extent of the second region R2, the larger the portion (a portion of the second region) where a uniform orientation is exhibited in a picture element region. The region where a uniform orientation is exhibited is a region where a uniform transmittance is obtained in a produced liquid crystal display device. The larger is this region, the higher the transmittance of the entire picture element region can be made (ideally, a uniform orientation should be exhibited across the entire picture element region as in, for example, a TN type liquid crystal display device known in the art), thereby providing an advantage in terms of the light efficiency.

As is apparent from the above description, the potential of the lower conductive layer 11 and the potential of the upper conductive layer 13 can be set so that the voltage applied across the liquid crystal layer 30 in the second region R2 is lower than the voltage applied across the liquid crystal layer 30 in the first region R1, thereby producing a sufficient potential gradient to regulate the orientation direction (inclination direction) of the liquid crystal molecules 30a in the vicinity of the boundary therebetween. The potential of the lower conductive layer 11 and the potential of the upper conductive layer 13 can be set in view of the voltage decrease due to the presence of the dielectric layer 12. If the degree of voltage drop by the dielectric layer 12 is sufficiently high, the lower conductive layer 11 and the upper conductive layer 13 can have the same potential. In such a case, there is an advantage that the structure of the liquid crystal display device 100 can be simplified. If the degree of voltage drop by the dielectric layer 12 is not sufficiently high, the potential of the lower conductive layer 11 can be set to be lower than the potential of the upper conductive layer 13 so that a sufficient potential gradient can be obtained.

In the description above, the correlation between the potentials of the lower conductive layer 11 and the upper conductive layer 13 with respect to the potential of the second electrode 22 has been described. Generally, an orientation-regulating force from an electric field can be obtained if the relationship $Vb \leq Va < Vc$ or $Vb \geq Va > Vc$ is satisfied, wherein Va denotes the potential of the lower conductive layer 11, Vb denotes the potential of the upper conductive layer 13, and Vc denotes the potential of the second electrode 22. The specific level of potential can be suitably set so as to obtain a desirable response speed and a desirable viewing angle characteristic in view of the structure of the liquid crystal display device 100 (the size of each picture element region, the physical property of the liquid crystal material, the width and number of openings, etc.).

Figure 2A:
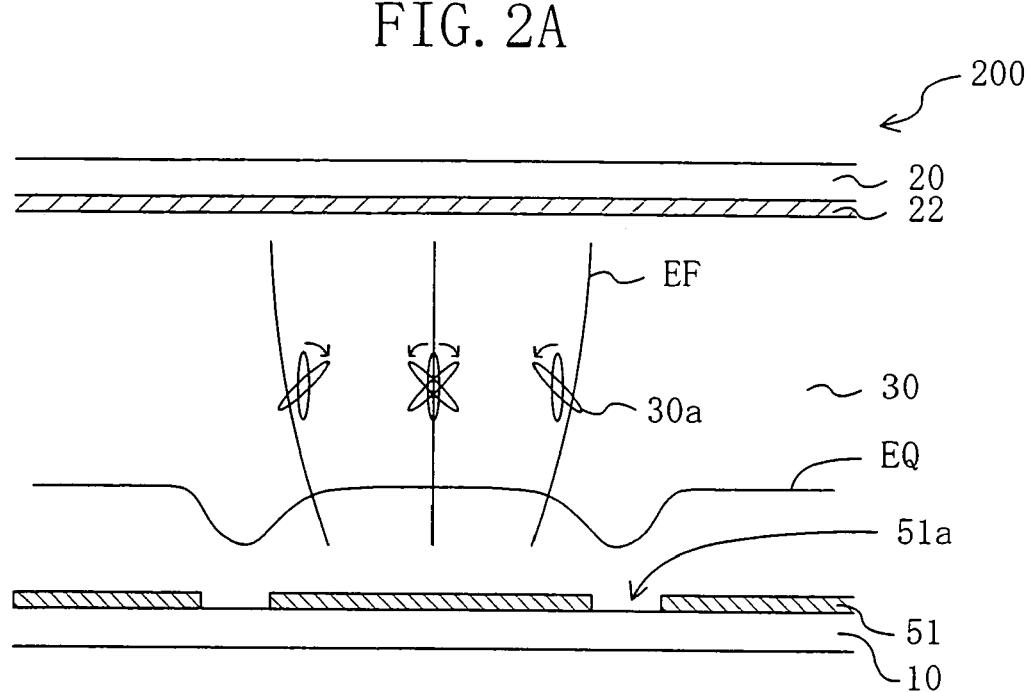
FIG. 2A is a diagram schematically illustrating a cross-sectional structure of a liquid crystal display device 200 of Comparative Example along with an equipotential line.
Figure 2B:
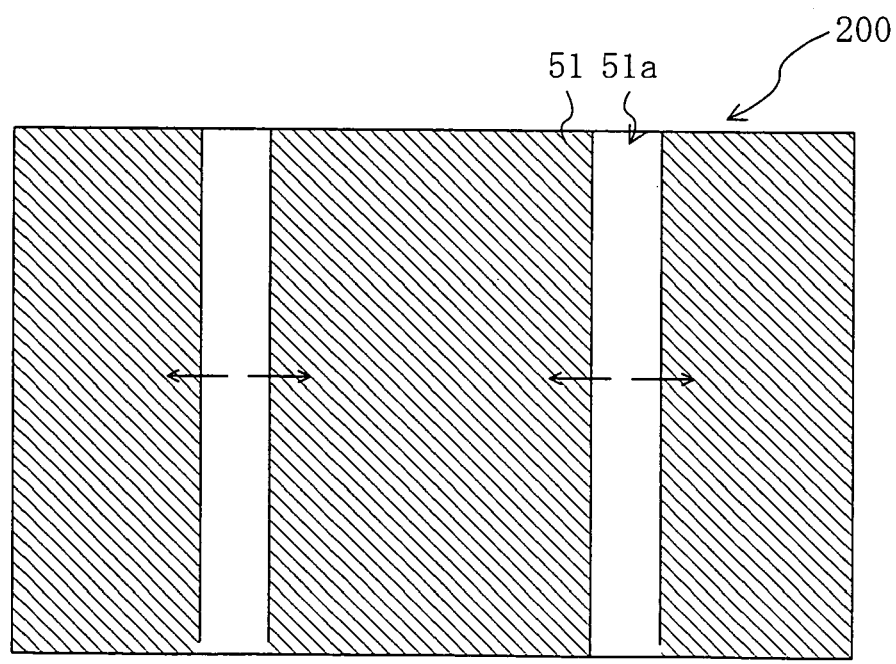
FIG. 2B is a plan view schematically illustrating the liquid crystal display device 200 of Comparative Example.

In order to further clarify the characteristic function of the electrode structure of the liquid crystal display device 100 according to the present invention, it will be compared with the function of a conventional electrode structure having an opening (slit). Conventionally, an opening is provided in an electrode made of a single conductive film. The conventional electrode structure as Comparative Example includes a first electrode 51 having an opening 51a therein as illustrated in FIG. 2A and FIG. 2B. FIG. 2A and FIG. 2B correspond to FIG. 1A and FIG. 1D, respectively.

A liquid crystal display device 200 of Comparative Example illustrated in FIG. 2A and FIG. 2B can be considered as the liquid crystal display device 100 from which the dielectric layer 12 and the upper conductive layer 13 (and of course the upper layer opening 13a) are removed. It can be considered that the lower conductive layer 11 and the lower layer opening 11a correspond to the first electrode 51 and the opening 51a, respectively. The other elements of the liquid crystal display device 200 are denoted by the same reference numerals as those of the liquid crystal display device 100, and will not be further described below.

In the presence of an applied voltage, an electric field as represented by electric force lines EF and an equipotential line EQ illustrated in FIG. 2A is produced in the liquid crystal layer 30 of the liquid crystal display device 200. An inclined electric field (potential gradient) is produced in the vicinity of the opening 51a, and the liquid crystal molecules 30a are inclined in the direction of the inclined electric field (potential gradient) (see FIG. 2A).

However, the electric force line EF of the electric field produced in the vicinity of the center of the first electrode 51 is vertical to the substrate and has no potential gradient. Therefore, a torque which would uniquely define the inclination direction does not act upon the liquid crystal molecules 30a present in the vicinity of the center of the first electrode 51, as indicated by a double-headed arrow in FIG. 2A. Moreover, the liquid crystal molecules 30a in the vicinity of the openings 51a on opposing sides of the liquid crystal molecules 30a in the vicinity of the center of the first electrode 51 have opposite inclination directions, and therefore the orientation direction of the liquid crystal molecules 30a in the vicinity of the center of the first electrode 51 is not regulated by the orientations of those liquid crystal molecules 30a. Thus, there is no factor which uniquely regulates the inclination direction of the liquid crystal molecules 30a in the vicinity of the center of the first electrode 51 of the liquid crystal display device 200. Therefore, the inclination direction of these liquid crystal molecules 30a is dominated by very subtle and uncertain factors such as by chance (probability), subtle geometric variations in the surface of the alignment layer (not shown), subtle variations in the tilt angle, and subtle variations in the resistivity of the electrode 51.

Prior art also shows (e.g., Japanese Laid-Open Patent Publication No. 11-109393) a structure similar to that illustrated in FIG. 2A and FIG. 2B but with an additional electrode being provided on the lower side (away from the liquid crystal layer) of the opening 51a via a dielectric layer so as to cover the entirety of the opening 51a with a conductive layer for the purpose of actively controlling the shape of the potential gradient, etc. Still, the behavior of the liquid crystal molecules as described above, i.e., the uncertainty and instability of the inclination direction (rotation direction) of the liquid crystal molecules in the vicinity of the center of the electrode 51 are not improved.

As described above, with the conventional electrode structure of the liquid crystal display device 200, it is not possible to obtain an orientation-regulating force on the liquid crystal molecules located in the vicinity of the center of the electrode 51. As a result, the boundary between the regions of different inclination directions (the adjacent regions whose inclination directions are respectively defined by the openings 51a) is not well defined, whereby it is not possible to realize a desirable viewing angle characteristic.

In contrast, with the electrode structure of the liquid crystal display device 100 of the present invention, the liquid crystal molecules 30a which are present on opposing sides of the liquid crystal molecules 30a of the second region R2 which are not subject to a torque from an electric field which would uniquely regulate the inclination direction (strictly speaking, they may be subject to an inclined electric field), i.e., the liquid crystal molecules 30a which are present in the vicinity of the boundary between the second region R2 and the first region R1 and in the vicinity of the boundary between the second region R2 and the third region R3, are inclined in the same direction by an influence of the inclined electric field. Therefore, with the change in the orientation of these liquid crystal molecules 30a being a trigger, the liquid crystal molecules 30a of the second region R2 are also uniquely inclined in the same direction as the liquid crystal molecules 30a on opposing sides thereof. Therefore, the electrode structure of the liquid crystal display device 100 according to the present invention generates an orientation-regulating force which uniquely determines the inclination direction of the liquid crystal molecules 30a across the entirety of the orientation-regulating region T1 or T2.

Next, a preferred arrangement of the orientation-regulating region T1 or T2 will be described.

Preferably, each of the upper layer opening 13a and the lower layer opening 11a has a side perpendicular to the direction in which the liquid crystal molecules 30a are inclined, and the boundary between the first region R1 and the second region R2 and the boundary between the second region R2 and the third region R3 extend along the side of the upper layer opening 13a and the lower layer opening 11a, as illustrated in FIG. 1D. With such a structure, the directions of the inclined electric fields produced around the respective region boundaries (between R1 and R2 and between R2 and R3) coincide with each other also in terms of the azimuth angle direction, thereby increasing the orientation-regulating effect. For example, each of the upper layer opening 13a and the lower layer opening 11a has a rectangular shape such that a pair of opposing sides thereof are perpendicular to the inclination direction.

For improving the viewing angle characteristic and the response speed, it is preferred to provide in each picture element region a plurality of orientation-regulating regions which regulate the orientation direction of the liquid crystal molecules in directions different from one another, thereby forming a multi-domain orientation. A sufficient response speed and viewing angle characteristic may be obtained even when a mono-domain structure is employed for each picture element region. Since the display signals of adjacent picture element regions are correlated with each other, it is possible to improve the viewing angle characteristic when the orientation directions of the orientation-regulating regions are different from each other between adjacent picture element regions. If a picture element region is small, it is possible to achieve a sufficient response speed by providing one orientation-regulating region therein. Moreover, it is possible to improve the response speed of a mono-domain-orientation picture element region by forming a plurality of orientation-regulating regions therein which orient the liquid crystal molecules in the same direction.

It is possible to improve the viewing angle characteristic by the unit of picture element region by providing a plurality of orientation-regulating regions T1 or T2 for each picture element region. It is preferred to provide in each picture element region orientation-regulating regions T1 (direction L) and T2 (direction −L) which define opposite inclination directions of the liquid crystal display device 100. The orientation-regulating regions T1 and T2 provided in each picture element region may take any of various arrangements. For example, as illustrated in FIG. 1A and FIG. 1B, the orientation-regulating regions T1 having the arrangement direction L and the orientation-regulating regions T2 having the arrangement direction −L may be provided in an alternating pattern so that the first region R1 and the third region R3 are shared by the orientation-regulating region T1 and the orientation-regulating region T2 which are adjacent to each other. Alternatively, each picture element region may be provided with a region TT3 in which the orientation-regulating regions T1 and T2 adjacent to each other share the first region R1, or each picture element region may be provided with a region TT4 in which the orientation-regulating regions T1 and T2 adjacent to each other share the third region R3. Such arrangements can be easily realized by employing the illustrated electrode structure.

Moreover, in order to obtain a highly symmetrical viewing angle characteristic, it is preferred to provide four or more orientation-regulating regions having different inclination directions (orientation axes). Particularly, in order to obtain a liquid crystal display device having a high light efficiency in addition to the highly symmetrical viewing angle characteristic, it is preferred to provide four orientation-regulating regions respectively having four different inclination directions. In such a case, it is preferred that the four inclination directions (orientation axes) are such that any two inclination directions selected from among the four inclination directions have an angle which is an integral multiple of about 90° with respect to each other. Moreover, when the plurality of orientation-regulating regions provided for each picture element region include a plurality of orientation-regulating regions having the same inclination direction, it is preferred that the total area of the orientation-regulating regions of the same inclination direction is equal to that of other orientation-regulating regions of another inclination direction. It is preferred that there are four respectively different inclination directions, and it is more preferred that any two inclination directions thereof have an angle which is an integral multiple of about 90° with respect to each other. Moreover, it is preferred that the number of orientation-regulating regions having one of the four inclination directions is equal to the number of orientation-regulating regions having any other one of the four inclination directions, and it is more preferred that the area of each orientation-regulating region is equal to that of any other orientation-regulating region.

As described above, it is preferred to provide in each picture element region a plurality of the orientation-regulating regions of the present invention. When a plurality of orientation-regulating regions are provided, the number thereof, the positional relationship therebetween (e.g., the setting of the orientation axis direction), and the area (the respective areas of the orientation-regulating regions) can be suitably set in view of the size and shape of the picture element region, the required response speed and viewing angle characteristic.

A sufficient response speed and viewing angle characteristic may be obtained even when a mono-domain structure (a single inclination direction) is employed for each picture element region. Since the display signals of adjacent picture element regions are correlated with each other, it is possible to improve the viewing angle characteristic when the inclination directions of the orientation-regulating regions are different from each other (preferably perpendicular to each other) between adjacent picture element regions. In the case of a color display device, this can be achieved by employing different inclination directions for adjacent pixel regions, each pixel region being comprised of R, G and B picture element regions. If a picture element region is small, it is possible to achieve a sufficient response speed by providing one orientation-regulating region therein. Moreover, it is possible to improve the response speed of a mono-domain-orientation picture element region by forming a plurality of orientation-regulating regions therein which have the same inclination direction.

As described above, the second electrode 22 opposing the first electrode 14 is not required to have any special structure for obtaining the effects of the present invention, and may be one which has a known electrode structure. Therefore, the following combinations, for example, are possible as the combination of the first electrode and the second electrode.

TABLE 1

| | First electrode | Second electrode |
| --- | --- | --- |
| Active matrix type | Picture element electrode | Counter electrode (common electrode) |
| | Counter electrode (common electrode) | Picture element electrode |
| Japanese Patent Publication for Opposition No. 7-113722 (see FIG. 7) | Counter striped electrode | Picture element electrode |
| | Picture element electrode | Counter striped electrode |
| PALC (see FIG. 9) | Striped electrode | Virtual electrode (thin dielectric plate) |

Moreover, with an active matrix type liquid crystal display device or a liquid crystal display device disclosed in Japanese Patent Publication for Opposition No. 7-113722, the second electrode 22 may have a similar structure to that of the first electrode 14 for each of the combinations.

Preferred embodiments of the present invention will now be described.

EMBODIMENT 1

A liquid crystal display device of Embodiment 1 is an active matrix type liquid crystal display device using TFTs, wherein picture element electrodes arranged in a matrix having rows and columns function as the first electrode, and a counter electrode which is used commonly to the plurality of picture element electrodes functions as the second electrode.

Figure 3A:
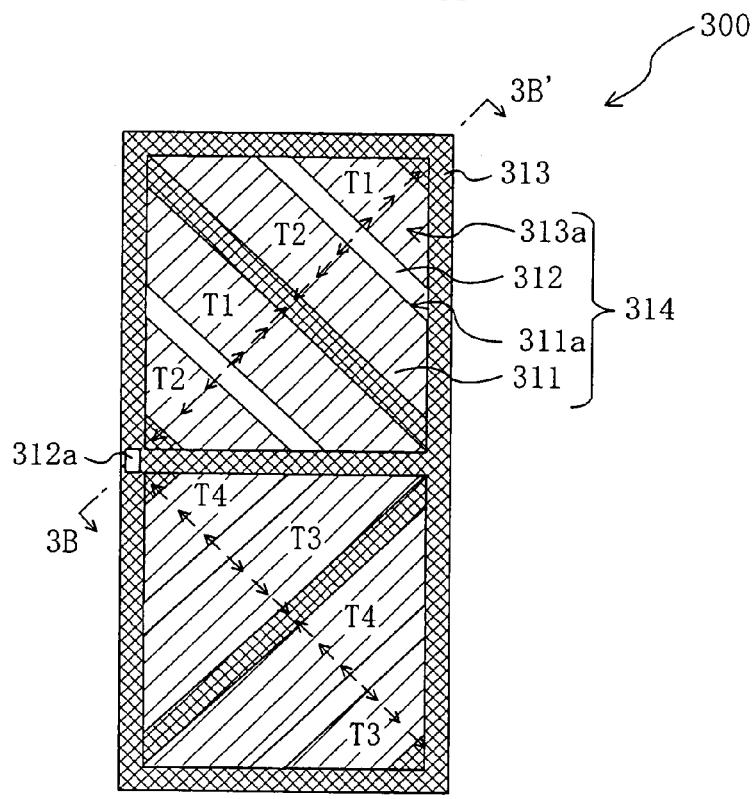
FIG. 3A is a plan view schematically illustrating a liquid crystal display device 300 of Embodiment 1 of the present invention.
Figure 3B:
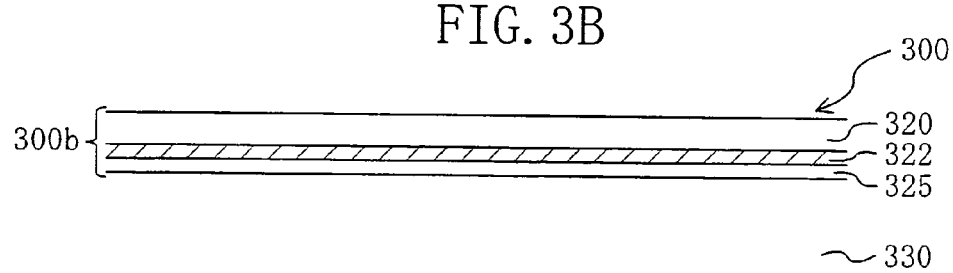
FIG. 3B is a cross-sectional view schematically illustrating the liquid crystal display device 300 of Embodiment 1 of the present invention.
Figure 3B:
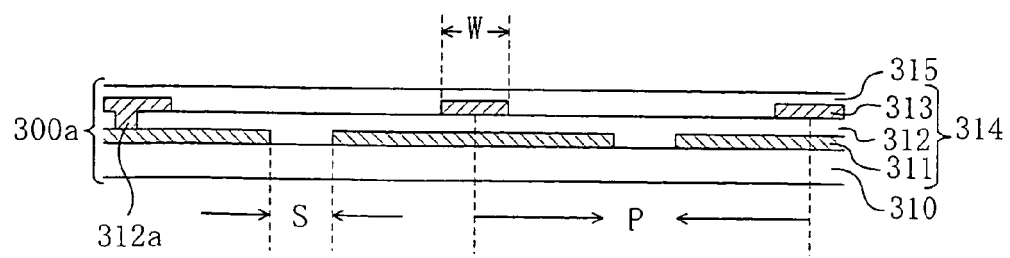

FIG. 3A and FIG. 3B schematically illustrate a liquid crystal display device 300 according to Embodiment 1 of the present invention. FIG. 3A is a plan view schematically illustrating a single picture element region (a TFT element, a storage capacitor element, etc., are omitted), and FIG. 3B is a cross-sectional view taken along line 3B-3B' of FIG. 3A.

The liquid crystal display device 300 includes a TFT substrate 300a, a counter substrate 300b and a liquid crystal layer 330 provided between the TFT substrate 300a and the counter substrate 300b. The liquid crystal layer 330 is a vertical alignment type liquid crystal layer containing liquid crystal molecules (not shown) having a negative dielectric anisotropy. Vertical alignment films 315 and 325 are provided on one surface of the TFT substrate 300a and the counter substrate 300b, respectively, which is closer to the liquid crystal layer 330.

The TFT substrate 300a of the liquid crystal display device 300 includes a glass substrate 310 and a picture element electrode 314 provided on the surface thereof. The counter substrate 300b includes a color filter substrate 320 and a counter electrode 322 provided on the surface thereof. The orientation of the liquid crystal layer 330 for each picture element region changes according to the voltage applied between the picture element electrode 314 and the counter electrode 322 which are arranged so as to oppose each other via the liquid crystal layer 330 therebetween.

The picture element electrode 314 of the liquid crystal display device 300 includes a lower conductive layer 311, a dielectric layer 312 covering the lower conductive layer 311, and an upper conductive layer 313 provided on one side of the dielectric layer 312 which is closer to the liquid crystal layer 330. The lower conductive layer 311 includes a lower layer opening 311a, and the upper conductive layer 313 includes an upper layer opening 313a. The lower layer opening 311a is arranged so as to be located within the upper layer opening 313a. The upper conductive layer 313 and the lower conductive layer 311 are electrically connected to each other via a contact hole 312a provided in the dielectric layer 312, and thus are at the same potential. The lower conductive layer 311 and the upper conductive layer 313 are electrically connected to a driving circuit (not shown) via a TFT (not shown). The TFT and the driving circuit may have structures known in the art.

The two-dimensional structure of the picture element electrode 314 will be described with reference to FIG. 3A. The shape of the picture element electrode 314 is an elongated rectangular shape as illustrated in FIG. 3A. The upper conductive layer 313 and the lower conductive layer 311 are each formed of a continuous conductive film. Each of the lower layer opening 311a and the upper layer opening 313a has a side extending in a direction at 45° with respect to the longer side and the shorter side of the picture element electrode 314 (the column direction and the row direction of the matrix arrangement). The direction in which the side extends differs by 90° between the upper half and the lower half of the picture element electrode 314.

First, the upper half of the picture element region in FIG. 3A will be focused upon. As illustrated in FIG. 3B, the structure of the cross section taken along line 3B-3B' is substantially the same as that illustrated in FIG. 1A. Therefore, as illustrated in FIG. 3A, the upper half of the picture element region of the liquid crystal display device 300 includes two pairs of orientation-regulating regions T1 and T2 having opposite liquid crystal molecule inclination directions, and the liquid crystal molecules in the orientation-regulating regions T1 and T2 are inclined as indicated by arrows in the figure. The lower half of the picture element region in FIG. 3A is in axisymmetry with the upper half with respect to the shorter side direction (e.g., the row direction) of the picture element electrode 314. The orientation-regulating regions T3 and T4 of the lower half have substantially the same function as that of the orientation-regulating regions T1 and T2 of the upper half except that the liquid crystal molecule inclination direction is different by 90°.

As described above, the picture element region of the liquid crystal display device 300 includes the orientation-regulating regions T1, T2, T3 and T4 having different liquid crystal molecule inclination directions (sometimes referred to as a "4-division multi-domain orientation"), thereby providing a desirable viewing angle characteristic. The orientation-regulating regions T1, T2, T3 and T4 have an equal area. Moreover, the four orientation-regulating regions T1, T2, T3 and T4 incline the liquid crystal molecules in respective directions (azimuth angle directions) which are shifted from one another by 90°. Thus, the uniformity of the viewing angle characteristic is high. In the illustrated example, two of each of the orientation-regulating regions T1, T2, T3 and T4 (a total of 8 orientation-regulating regions) are provided. However, it is not necessary to provide so many orientation-regulating regions. Generally, in view of the viewing angle characteristic, a sufficient characteristic can be obtained by dividing each picture element region into four orientation-regulating regions of different orientation directions. The number of orientation-regulating regions for each picture element region can be selected according to the required response speed.

The thickness $d_{LC}$ of the liquid crystal layer 330 (referred to also as the "cell gap") of the liquid crystal display device 300 is, for example, about 4 μm. As the liquid crystal material, a typical liquid crystal material having a negative dielectric anisotropy (for example, MJ95955 manufactured by Merck & Co., Inc.: dielectric constants $\epsilon_\parallel = 3.4$, $\epsilon_\perp = 6.7$, $\Delta\epsilon = -3.3$) is used. As the vertical alignment films 315 and 325, a typical vertical alignment film (for example, JALS2004 manufactured by JSR) is used. The thickness $d_{LC}$ of the liquid crystal layer 330 is not limited to the example above, but may take any other value as long as it is generally in the range of about 2 μm to about 20 μm and the product between the refractive index anisotropy Δn of the liquid crystal material and $d_{LC}$ ("retardation") is in the range of 100 nm to 500 nm.

The thickness $d_D$ of the dielectric layer 312 is, for example, about 3 μm. The dielectric layer 312 is formed by using a typical organic material (for example, a photosensitive organic insulative material having a relative dielectric constant of about 3.4). The material of the dielectric layer 312 is not limited to an organic material (typically, a polymer material), but may alternatively be an inorganic material (for example, silicon oxide ($SiO_x$) or silicon nitride ($SiN_x$)).

The thickness $d_D$ of the dielectric layer 312 is not limited to the example above, but may take any other value as long as it is about 0.01 to about 1000 times the thickness $d_{LC}$ of the liquid crystal layer 330. The thickness $d_D$ of the dielectric layer 312 is preferably in the range of 0.5 to 5 μm, and more preferably in the range of 1 to 3 μm. Alternatively, the thickness $d_D$ of the dielectric layer 312 is preferably such that the value $\epsilon_D/d_D$ is about 0.05 to about 20, and more preferably about 0.3 to 5, times the value $\epsilon_\parallel/d_{LC}$ (wherein $\epsilon_D$ denotes the dielectric constant of the dielectric layer 312, $d_{LC}$ the thickness of the liquid crystal layer 330, and $\epsilon_\parallel$ the dielectric constant of the liquid crystal material).

When the thickness $d_D$ of the dielectric layer 312 increases, the voltage applied across the liquid crystal layer 330 above the upper layer opening 313a decreases due to the capacitance division of the dielectric layer 312 and the liquid crystal layer 330, thereby requiring a high voltage in order to obtain a desirable transmittance. On the other hand, when the voltage decrease by the dielectric layer 312 increases, the inclination (bending) of an electric field produced in the vicinity of the boundary of the upper layer opening 313a increases, thereby providing an advantageous effect that the orientation-regulating force increases. The thickness $d_D$ of the dielectric layer 312 can be suitably set as necessary.

The width W of the upper conductive layer 313 illustrated in FIG. 3B (corresponding to the width of R1 in FIG. 1A) and the width S of the lower layer opening 311a (corresponding to the width of R3 in FIG. 1A) are each 10 μm, for example. The width W and the width S are each a width in a direction perpendicular to the direction in which the liquid crystal molecules are inclined in the orientation-regulating region. The widths W and S are not limited to the value shown above, but may take any other value as long as it is about 0.1 to about 100 times the thickness $d_{LC}$ of the liquid crystal layer 330. The preferred range for the widths W and S depends upon the thickness $d_{LC}$ of the liquid crystal layer 330 because the electric field distribution produced in the liquid crystal layer 330 is dependent upon the physical positions of the lower conductive layer 311, the upper conductive layer 313 and the counter electrode 322 (the inter-electrode distance) and the dielectric constant of the dielectric layer 312 and the liquid crystal layer 330 being interposed therebetween. In view of the dielectric constants of typical dielectric materials and liquid crystal materials, a sufficient orientation-regulating force can be realized by setting the widths W and S generally in the above-described range.

The pitch P of the upper conductive layer 313 (corresponding to the width of (R2×2)+R1+R3 in FIG. 1A) is 50 μm, for example. Therefore, the width of the upper layer opening 313a in the illustrated structure is pitch P (50 μm)–width W of the upper conductive layer (10 μm), thus 40 μm. In this way, the structure of the lower conductive layer 311, the lower layer opening 311a, the upper conductive layer 313 and the upper layer opening 313a can be optimized.

Generally, each of the width of the first region (corresponding to the width of R1 in FIG. 1A, or the width W in FIG. 3B) and the width of the third region (corresponding to the width of R3 in FIG. 1A, or the width S in FIG. 3B) is preferably about 1 μm to about 100 μm. When the width is less than 1 μm, the inclination of an electric field in the vicinity of the boundary between the first region and the second region and the boundary between the second region and the third region is reduced so that a sufficient orientation-regulating force cannot be obtained. As a result, the response speed may be too slow or the orientation stability may be undesirably low. When the width is greater than 200 μm, a sufficient orientation-regulating force may not be obtained for the liquid crystal molecules in the vicinity of the center of the region, thereby deteriorating the display quality. A more preferred range for the width of the first and third regions is about 5 μm to about 20 μm, and the range of about 10 μm to about 20 μm is particularly preferred. When these widths are too small, a sufficient orientation-regulating force cannot be obtained, and the widths being too large are not preferred because then the region which is not used for display increases.

The width of the second region (corresponding to the width of R2 in FIG. 1A, or (P–W–S)/2 in FIG. 3B) is preferably about 5 μm to about 1000 μm. When the width is smaller than 5 μm, an electric field is inclined in all of the first, second and third regions, whereby the rotation angle (inclination angle) of the liquid crystal molecules, i.e., the retardation value of the liquid crystal layer, varies throughout the regions. As a result, the light efficiency decreases. When the width of the second region is greater than 1000 μm, the light efficiency increases, but the response speed decreases significantly. The reason for this is as follows. When the width of the second region is so large, the electric field in the central portion of the second region in the width direction thereof is not inclined, whereby an orientation-regulating force from the electric field is not generated. The liquid crystal molecules in the central portion are inclined in a certain direction by being influenced by the orientation of the liquid crystal molecules which are inclined in the vicinity of the boundary between the second region and the first region and in the vicinity of the boundary between the second region and the third region. Therefore, as the distance from the central portion of the second region to its boundary with the adjacent first or third region increases, the propagation of the influence from the orientation of the liquid crystal molecules in the vicinity of the boundary slows down or is lost. In order to obtain a sufficient orientation-regulating force and light efficiency, the width of the second region is more preferably in the range of about 10 μm to about 50 μm.

Thus, the electrode structure for producing a sufficient orientation-regulating force of the present invention can be obtained by suitably setting the number of regions into which a picture element region is divided (the variation in the number of orientation-regulating regions and the inclination direction thereof), the width W of the upper conductive layer 313, the width S of the lower layer opening 311a, the pitch P of the upper conductive layer 313, etc., according to the size and shape of a picture element region of the particular liquid crystal display device to be produced. The variation in the division number and the inclination direction is set primarily in connection with the viewing angle characteristic, and the physical structure (size, shape, etc.) of the electrode is set primarily in connection with the response speed.

The lower conductive layer 311 and the upper conductive layer 313 of the picture element electrode 314, and the counter electrode 322, are formed by using a transparent conductive material (ITO), for example. The upper conductive layer 313 may be formed by using an opaque material because it has a high proportion of the upper layer opening 313a. The upper conductive layer 313 may be formed by using a metal material (e.g., aluminum, an aluminum alloy, copper). The metal material is generally superior to a transparent conductive material in terms of the machinability, and therefore preferably used as a material of the upper conductive layer 313, in which case a minute pattern can be formed efficiently.

The liquid crystal display device 300 having such a structure as described above can function as a transmission type liquid crystal display device. However, the liquid crystal display device 300 can be provided as a reflection type liquid crystal display device by, for example, forming the upper conductive layer 313 and the lower conductive layer 311 by using a metal material.

Figure 4:
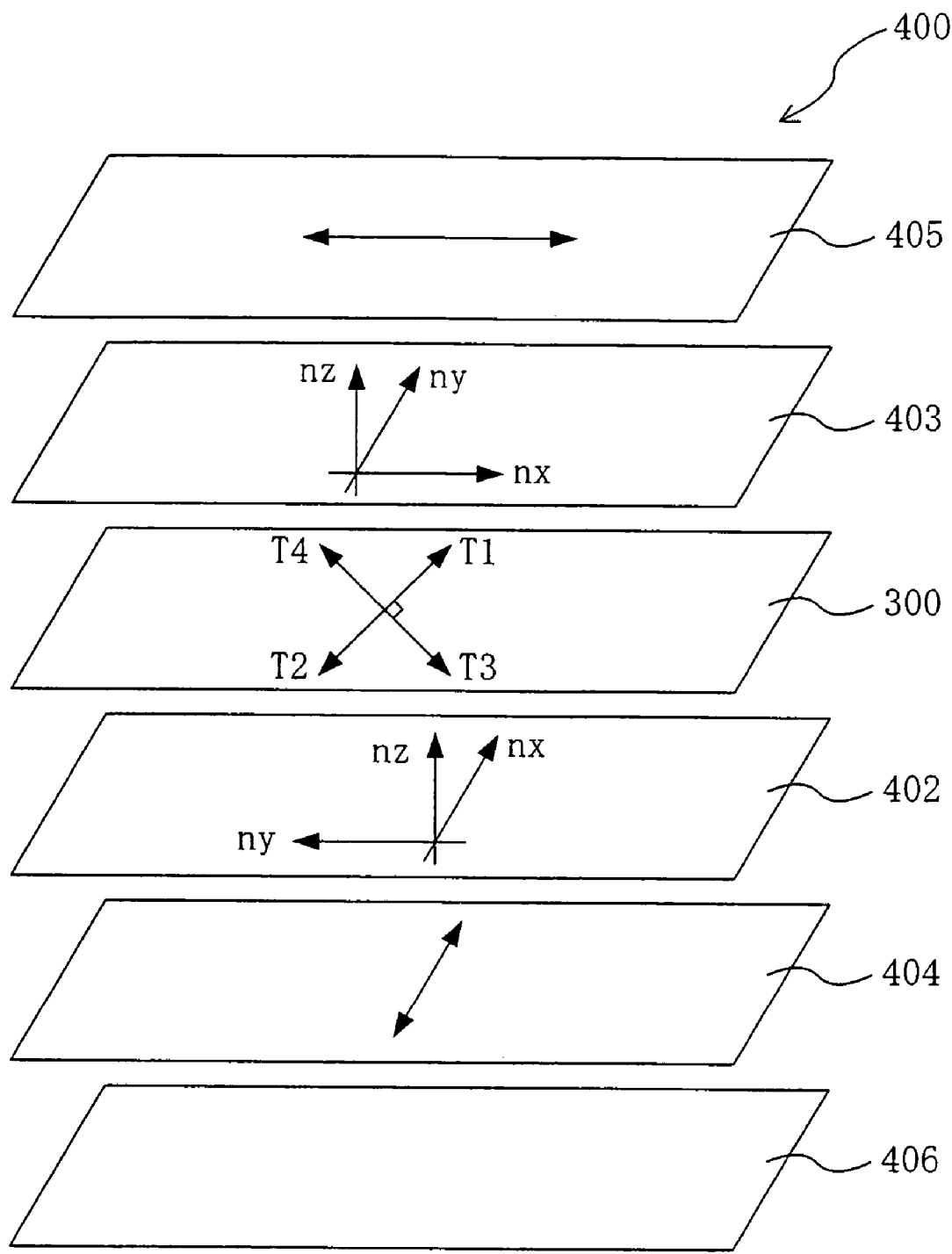
FIG. 4 is a diagram schematically illustrating a liquid crystal display device 400 of Embodiment 1 of the present invention.

The liquid crystal display device 300 having such a structure as described above is provided with, for example, polarizers (including a polarizing plate, a polarizing film, and the like) 404 and 405, phase difference compensation elements (including a phase plate, a phase film, and the like) 402 and 403, and a backlight 406, as illustrated in FIG. 4, thereby obtaining a transmission type liquid crystal display device 400 of a normally black mode having a desirable display quality. In FIG. 4, arrows in the polarizers 404 and 405 denote the respective transmission axes (polarization axes) thereof, and arrows in the phase difference compensation elements 402 and 403 denote the primary axis directions of index ellipsoids representing the respective refractive index anisotropies of the phase difference compensation elements.

The polarizers 404 and 405 are arranged in a crossed-Nicols state so as to produce a black display in the absence of an applied voltage (when the liquid crystal layer 330 is in a vertical alignment). The transmission axes of the polarizers 404 and 405 are arranged in parallel to the top-bottom direction and the left-right direction, respectively, of the display plane. The transmission axes are typically arranged so as to form an angle of 45° with respect to the inclination directions of the orientation-regulating regions T1, T2, T3 and T4 which are indicated by arrows in FIG. 3A. It is possible to improve the transmittance (the light efficiency) by dividing each picture element region into four regions so that the inclination direction of each of the orientation-regulating regions T1, T2, T3 and T4 forms an angle of 45° with respect to the transmission axis of each of the polarizers 404 and 405 which are arranged in a crossed-Nicols state.

The phase difference compensation elements 402 and 403 are designed so as to compensate for changes in the retardation value of the liquid crystal layer 330 due to changes in the viewing angle in a black display state in the absence of an applied voltage. This design can be achieved by using a method known in the art.

Figure 5:
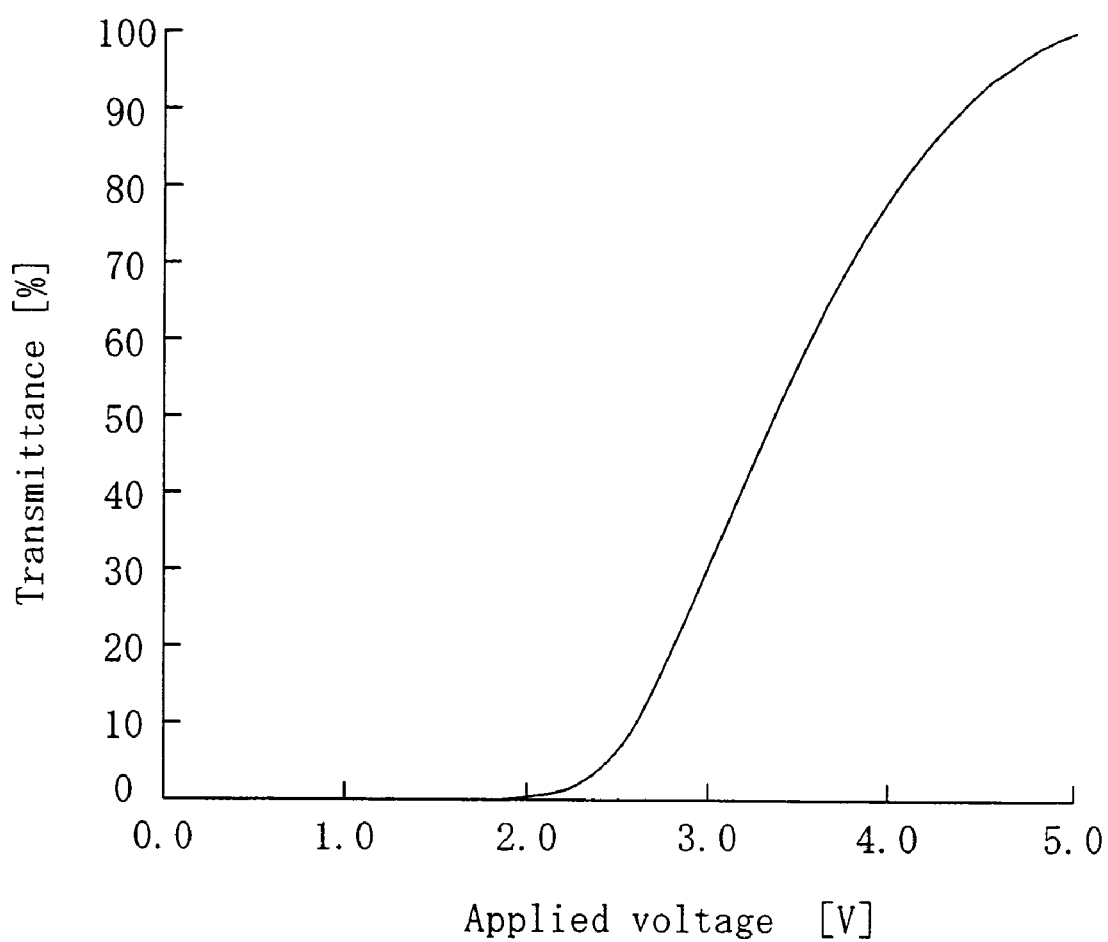
FIG. 5 is a graph illustrating the applied voltage dependency of the transmittance of the liquid crystal display device 400.

FIG. 5 illustrates the applied voltage dependency of the transmittance of the liquid crystal display device 400. As is apparent from FIG. 5, the liquid crystal display device 400 has a desirable voltage-transmittance characteristic of a normally black mode. The vertical axis of FIG. 5 denotes the relative transmittance, and the horizontal axis denotes the absolute value of the voltage applied between the picture element electrode 314 and the counter electrode 322.

Figure 6:
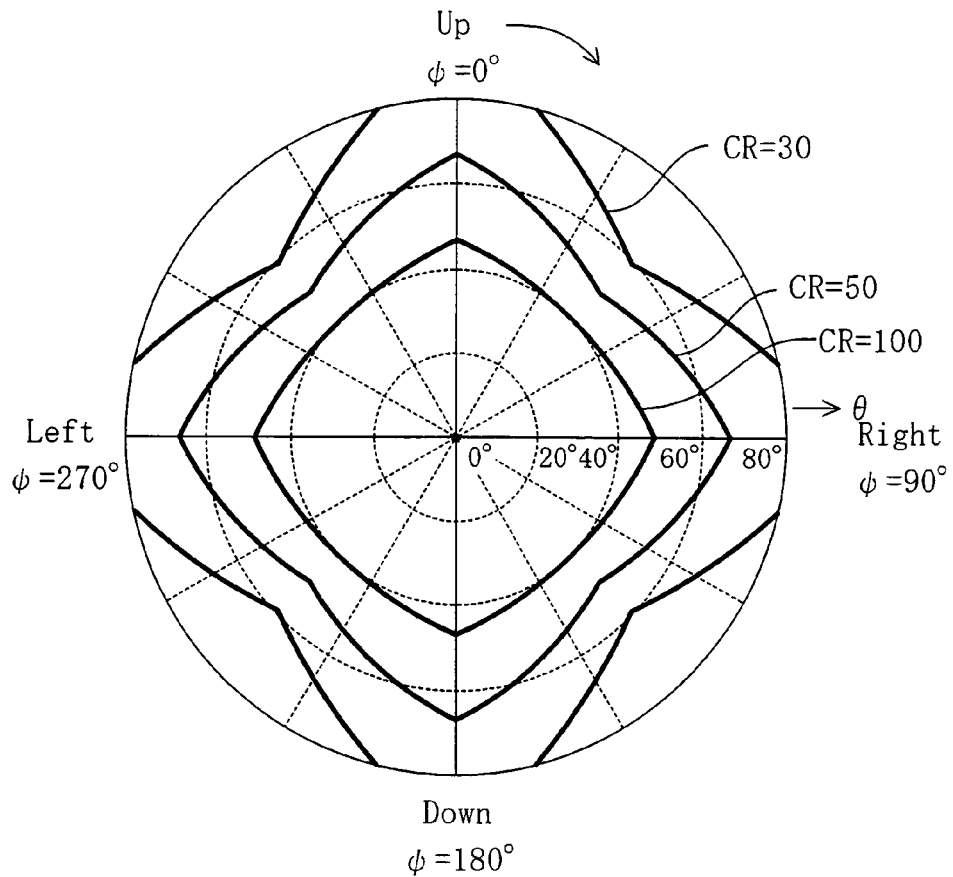
FIG. 6 is an iso-contrast contour curve (contrast ratio=30) of the liquid crystal display device 400.

Next, FIG. 6 illustrates an iso-contrast contour curve (contrast ratio=30) of the liquid crystal display device 400. The symbol ψ in the iso-contrast contour curve denotes the azimuth angle (the angle in the display plane), with ψ=0° corresponding to the 12 o'clock direction of the display plane, and the value increasing as the angle moves clockwise. The symbol θ denotes the viewing angle (the angle with respect to the normal to the display plane), and the value increases as the viewing angle moves radially away from the center of the circle. As is apparent from FIG. 6, the contrast ratio is 30 or more in the region where the viewing angle θ is 60° or less for substantially any azimuth angle ψ, thus indicating that the liquid crystal display device 400 has a desirable viewing angle characteristic. Moreover, as illustrated in FIG. 6, the azimuth angle dependency of the viewing angle characteristic is uniform (i.e., the contour pattern is equivalent for any of the four directions; the contour pattern has a four-fold rotational symmetry). Thus, it is assumed that the liquid crystal display device 400 has a desirable 4-division multi-domain orientation. In the liquid crystal display device 400, whether or not a desirable 4-division multi-domain orientation is realized for each picture element region according to the orientation-regulating forces produced respectively in the orientation-regulating regions T1, T2, T3 and T4 illustrated in FIG. 3A can be confirmed by observing with a microscope the picture element region from an inclined direction (with respect to the normal to the display plane).

Figure 7:
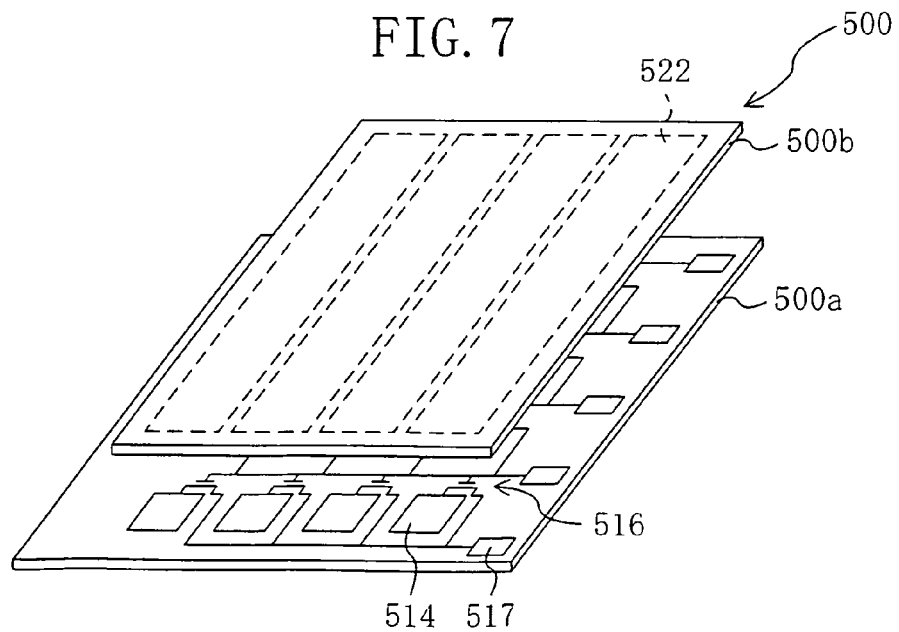
FIG. 7 is a diagram schematically illustrating a liquid crystal display device 500 of Embodiment 1 of the present invention.

While a typical TFT type liquid crystal display device has been shown above as an example of the liquid crystal display device 300, the present invention can be used with a TFT type liquid crystal display device having a structure as illustrated in FIG. 7 which is disclosed in, for example, Japanese Patent Publication for Opposition No. 7-113722.

A liquid crystal display device 500 illustrated in FIG. 7 includes a first substrate 500a, picture element electrodes 514 arranged in a matrix, TFTs 516 whose drains are connected to the picture element electrodes 514, and scanning lines (scanning bus lines) 517 which are connected to the gates of the TFTs 516. A second substrate 500b which opposes the first substrate 500a via the liquid crystal layer (not shown) therebetween includes signal lines (data bus lines) 522 arranged in a stripe pattern on the side of the liquid crystal layer. The scanning lines 517 and the signal lines 522 extend perpendicular to each other. The TFT type liquid crystal display device 500 is different from the above-described typical TFT type liquid crystal display device which has a single counter electrode used commonly to all of the picture element electrodes in that the former includes, as the electrodes on the second substrate 500b, signal lines electrically independent of each other and arranged in a stripe pattern. Also in the liquid crystal display device 700, the effects of the present invention can be obtained by employing the structure of the picture element electrode 314 illustrated in FIG. 3A and FIG. 3B for the picture element electrode 514.

EMBODIMENT 2

The TFT type liquid crystal display device 300 of Embodiment 1 employs the structure of the first electrode 14 illustrated in FIG. 1A for the picture element electrodes of the conventional TFT type liquid crystal display device. In contrast, a TFT type liquid crystal display device of Embodiment 2 employs a structure similar to that of the first electrode 14 illustrated in FIG. 1A for a counter electrode of the conventional TFT type liquid crystal display device. The structure of the liquid crystal display device of Embodiment 2 may be the same as that of the conventional liquid crystal display device (having the structure of the liquid crystal display device 300 of Embodiment 1 except for the picture element electrode 314) except for the structure of the counter electrode. Accordingly, only the structure of the counter electrode will be described below.

Figure 8:
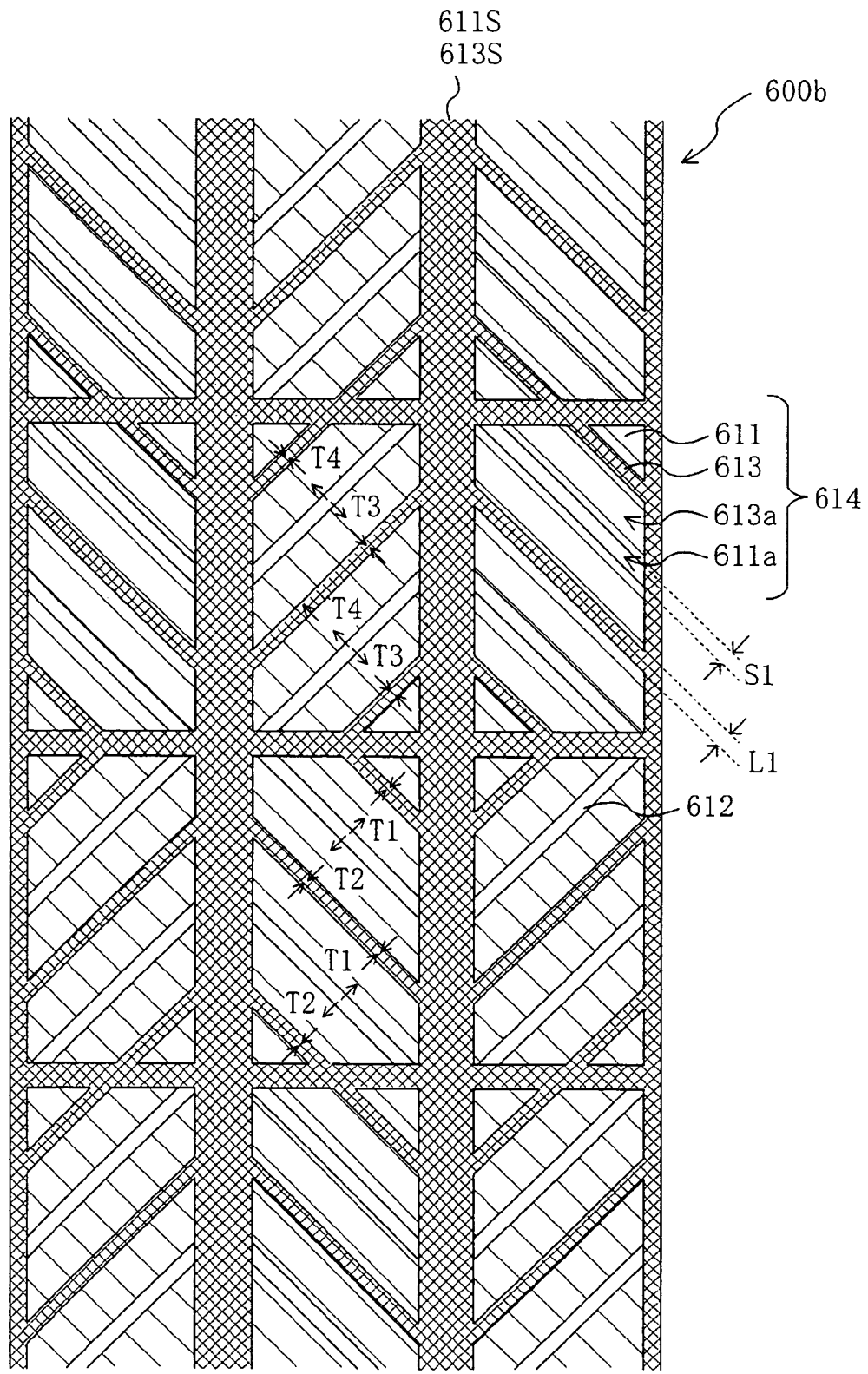
FIG. 8 is a plan view of a counter substrate 600b used in a liquid crystal display device of Embodiment 2 of the present invention.

FIG. 8 shows a plan view of a counter substrate 600b of the liquid crystal display device of Embodiment 2. The counter substrate 600b includes a counter electrode 614 on one side thereof which is closer to the liquid crystal layer. The counter electrode 614 includes a lower conductive layer 611, a dielectric layer 612 covering the lower conductive layer 611, and an upper conductive layer 613 provided on one side of the dielectric layer 612 which is closer to the liquid crystal layer. The lower conductive layer 611 includes a lower layer opening 611a, and the upper conductive layer 613 includes an upper layer opening 613a. The lower layer opening 611a is arranged so as to be located within the upper layer opening 613a. The upper conductive layer 613 and the lower conductive layer 611 are electrically connected to each other along their straight portions 611S and 613S extending in the column direction of the matrix, for example, and thus are at the same potential. The dielectric layer 612 along the straight portions 611S and 613S includes contact holes (not shown; not limited to holes, but may be grooves) for electrically connecting the upper conductive layer 613 and the lower conductive layer 611 to each other.

The counter electrode 614 has a structure similar to that of the first electrode 14 illustrated in FIG. 1A, corresponding to, for example, an elongated rectangular picture element electrode (not shown; for example, 70 μm×210 μm for 18-inch type SXGA). For example, two rectangular regions in FIG. 8

(those provided with arrows therein) correspond to a single rectangular picture element region. The respective widths L1 and S1 of the upper conductive layer 613 and the lower layer opening 611a which are each arranged in a striped pattern between two adjacent upper layer openings 613a are set similarly to the widths W and S, respectively, of the liquid crystal display device 300 of Embodiment 1. Each of the lower layer opening 611a and the upper layer opening 613a has a side extending in a direction at 45° with respect to the longer side and the shorter side of the picture element region (the column direction and the row direction of the matrix arrangement). The direction in which the side extends differs by 90° between the upper half and the lower half of the picture element region. This structure of the regions corresponding to a single picture element region of the counter electrode 614 is similar to that of the picture element electrode 314 illustrated in FIG. 3A, forming the orientation-regulating regions T1, T2, T3 and T4.

Thus, the picture element region of the liquid crystal display device of the present embodiment includes the orientation-regulating regions T1, T2, T3 and T4 having different liquid crystal molecule inclination directions (sometimes referred to as a "4-division multi-domain orientation"), thereby providing a desirable viewing angle characteristic as the liquid crystal display device of Embodiment 1. In the liquid crystal display device of the present embodiment, whether or not a desirable 4-division multi-domain orientation is realized for each picture element region according to the orientation-regulating forces produced respectively in the orientation-regulating regions T1, T2, T3 and T4 illustrated in FIG. 8 can be confirmed by observing with a microscope the picture element region from an inclined direction (with respect to the normal to the display plane).

In order to prevent the orientation of the liquid crystal molecules from being disturbed by an external electric field (an electric field caused by a electrostatic charge, etc.) entering the liquid crystal layer through the lower layer opening 611a, it is preferred that a conductive layer fixed to a certain potential is provided surrounding the lower layer opening 611a (for example, surrounding the counter substrate, the surface of a polarizer, or under a further dielectric layer provided under (on the substrate side of) the lower layer opening 611a).

Moreover, the liquid crystal display device is provided with the polarizers (including a polarizing plate, a polarizing film, and the like) 404 and 405, the phase difference compensation elements (including a phase plate, a phase film, and the like) 402 and 403, and the backlight 406, as illustrated in FIG. 4, thereby obtaining a transmission type liquid crystal display device of a normally black mode having a desirable display quality.

EMBODIMENT 3

According to the present invention, it is possible to obtain a sufficient orientation-regulating force by, for example, employing an electrode structure similar to that of the first electrode 14 illustrated in FIG. 1A for the structure of one of a pair of electrodes which oppose each other via a liquid crystal layer therebetween. Therefore, even with a PALC, for which it is difficult to obtain an orientation-regulating force with the conventional structure (e.g., that disclosed in Japanese Laid-Open Patent Publication No. 11-258606), a sufficient orientation-regulating force can be obtained by employing the electrode structure of the present invention.

The structure and operation of a liquid crystal display device 700 of Embodiment 3, which uses the present invention with a PALC, will now be described.

Figure 9:
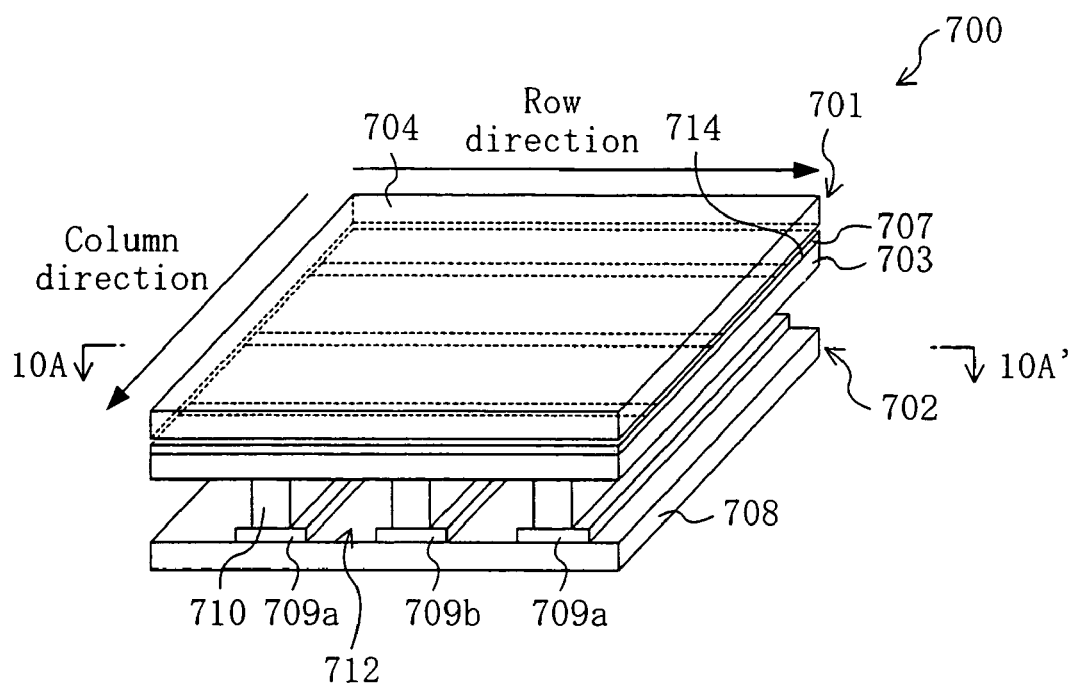
FIG. 9 is a perspective view schematically illustrating a liquid crystal display device 700 of Embodiment 3 of the present invention.
Figure 10:
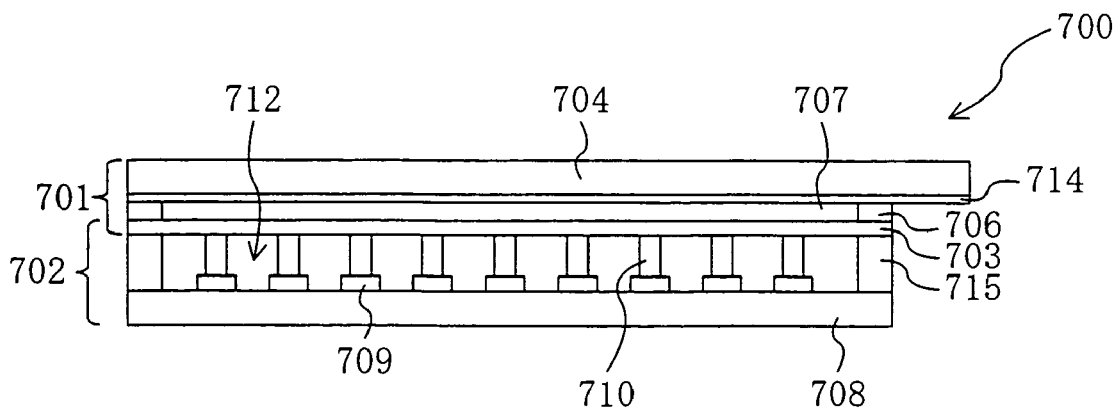
FIG. 10 is a cross-sectional view schematically illustrating the liquid crystal display device 700 of Embodiment 3 of the present invention.

FIG. 9 schematically illustrates the liquid crystal display device 700 of Embodiment 3. The liquid crystal display device 700 includes a liquid crystal display cell 701 and a plasma cell 702. The liquid crystal display cell 701 and the plasma cell 702 share a thin dielectric plate 703.

The liquid crystal display cell 701 includes an upper substrate (e.g., a glass substrate) 704, a thin dielectric plate 703, and a liquid crystal layer 707 provided therebetween. A plurality of data electrodes 714 arranged in a stripe pattern which extend in parallel to one other (in, for example, the row direction) are provided on one side of the upper substrate 704 which is closer to the liquid crystal layer 707. The upper substrate 704 and the thin dielectric plate 703 are attached to each other while keeping a predetermined gap (cell gap) by means of a sealant 706. The gap between the upper substrate 704 and the thin dielectric plate 703 is filled with a liquid crystal material having a negative dielectric anisotropy, and a vertical alignment film (not shown) is provided on one surface of each of the upper substrate 704 and the thin dielectric plate 703 which is closer to the liquid crystal layer 707. The liquid crystal layer 707 is in a vertical alignment in the absence of an applied voltage.

The plasma cell 702 includes a plurality of plasma discharge channels 712 extending in parallel to one another (in, for example, the column direction) which are formed by a lower substrate (for example, a glass substrate) 708, the thin dielectric plate 703, and partition walls 710 provided therebetween. On one side of the lower substrate 708 which is closer to the plasma discharge channels 712, a plurality of anode electrodes 709a and a plurality of cathode electrodes 709b extending in parallel to each other (in, for example, the column direction) are provided in an alternating pattern with a predetermined interval therebetween. The anode electrodes 709a and the cathode electrodes 709b are sometimes referred to collectively as a "plasma electrode 709". The partition walls 710 are provided with a predetermined width so as to extend in parallel to one another and substantially along the central portion of the upper surface of each of the anode electrodes 709a and the cathode electrodes 709b. The lower substrate 708 along the periphery thereof is hermetically attached to the thin dielectric plate 703 by means of a frit seal 715 using a low melting point glass, or the like. The plasma discharge channels 712 are filled with an ionizable gas (for example, helium, neon, argon, or a mixed gas thereof), and a plasma discharge occurs by applying a voltage through the gas by the plasma electrode 709.

The plasma discharge channels 712 and the data electrodes 714 are perpendicular to each other. Each of the data electrodes 714 is a unit of column driving operation, for example, and each of the plasma discharge channels 712 is a unit of row driving operation, for example. Each intersection between the data electrodes 714 and the plasma discharge channels 712 defines a picture element region.

The liquid crystal display device 700 operates as follows.

When a predetermined voltage is applied between the anode electrode 709a and the cathode electrode 709b which correspond to a predetermined plasma discharge channel 712, the gas in the plasma discharge channel 712 is selectively ionized to generate a plasma discharge, and the inside of the plasma discharge channel 712 is kept generally at the anode potential (row addressing state; write period). In this state, if a data voltage is applied to the data electrode 714, a voltage corresponding to the difference between the anode potential and the data potential of the data electrode 714 is applied via the thin dielectric plate 703 across the liquid crystal layer 707 of the picture element regions which are arranged in the column direction corresponding to the plasma discharge channel 712. At this time, a region of the thin dielectric plate 703 corresponding to the plasma discharge channel 712 which is in a discharge state functions as a virtual scanning electrode. Thus, data is written to the picture element regions arranged in the column direction.

Upon completion of the plasma discharge, the inside of the plasma discharge channel 712 has a floating potential, whereby the data voltage which has been written to the liquid crystal layer 707 of each picture element region is maintained until the following write period which is, for example, one field or one frame later. In such a case, the plasma discharge channel 712 functions as a sampling switch while the liquid crystal layer 707 of each picture element region functions as a sampling capacitor.

An image is displayed by successively scanning, in the row direction, the plasma discharge channels 712 which extend in the column direction, thereby writing data voltages from the data electrodes 714 extending in the row direction to the liquid crystal layer 707 of a plurality of picture element regions arranged in the column direction.

In the PALC, the voltage applied across the liquid crystal layer 707 corresponds to a voltage which is obtained by dividing the potential difference between the anode potential and the data potential of the data electrode 714 by the thin dielectric plate 703 and the liquid crystal layer 707. Therefore, it is preferred to reduce the thickness of the thin dielectric plate 703 as much as possible in order to suppress as much as possible the voltage drop by the thin dielectric plate 703. Typically, a thin glass plate having a thickness of about 50 μm is used. Since such a thin glass plate is poor in physical strength, it is very difficult to form a special structure on the thin dielectric plate 703. Therefore, it is not possible to use an orientation-regulating method which requires a special structure to be provided on substrates on both sides of the liquid crystal layer, as that disclosed in Japanese Laid-Open Patent Publication No. 11-258606.

Figure 11:
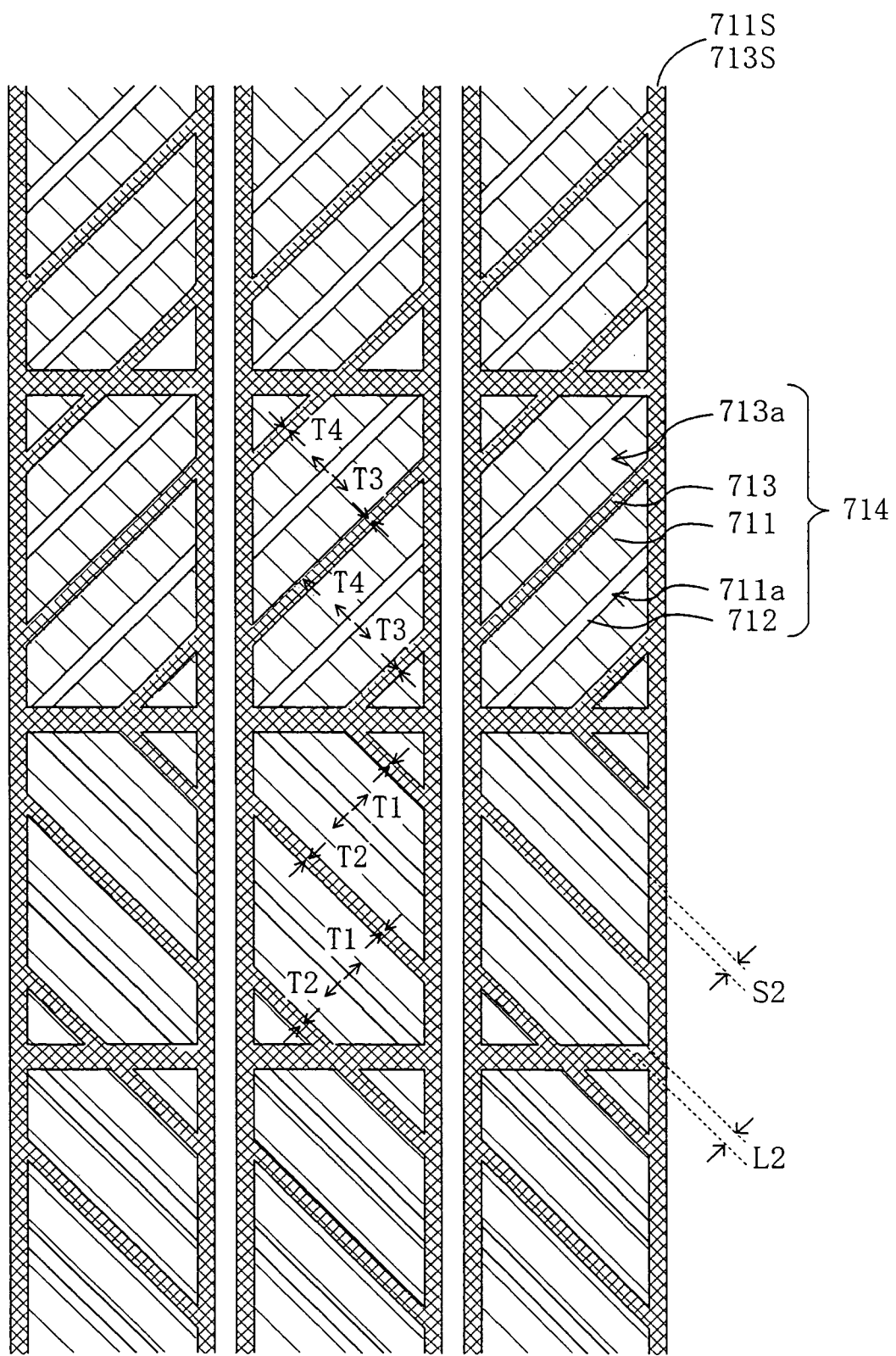
FIG. 11 is a diagram schematically illustrating the planar structure of a data electrode 714 of the liquid crystal display device 700.

In the liquid crystal display device 700 of Embodiment 3, the data electrode 714 has a structure similar to that of the first electrode 14 illustrated in FIG. 1A. FIG. 11 schematically illustrates the planar structure of the data electrode 714 of the liquid crystal display device 700.

The data electrode 714 includes a lower conductive layer 711, a dielectric layer 712 covering the lower conductive layer 711, and an upper conductive layer 713 provided on one side of the dielectric layer 712 which is closer to the liquid crystal layer. The lower conductive layer 711 includes a lower layer opening 711a, and the upper conductive layer 713 includes an upper layer opening 713a. The lower layer opening 711a is arranged so as to be located within the upper layer opening 713a. The upper conductive layer 713 and the lower conductive layer 711 are electrically connected to each other along their straight portions 711S and 713S extending in the column direction of the matrix, for example, and thus are at the same potential. The dielectric layer 712 along the straight portions 711S and 713S includes contact holes (not shown; not limited to holes, but may be grooves) for electrically connecting the upper conductive layer 713 and the lower conductive layer 711 to each other.

The data electrode 714 has a structure similar to that of the first electrode 14 illustrated in FIG. 1A, corresponding to, for example, an elongated rectangular picture element electrode (not shown; for example, 70 μm×210 μm for 18-inch type SXGA). For example, two rectangular regions in FIG. 11 (those provided with arrows therein) correspond to a single rectangular picture element region. The respective widths L2 and S2 of the upper conductive layer 713 and the lower layer opening 711a which are each arranged in a striped pattern between two adjacent upper layer openings 713a are set similarly to the widths W and S, respectively, of the liquid crystal display device 300 of Embodiment 1. Each of the lower layer opening 711a and the upper layer opening 713a has a side extending in a direction at 45° with respect to the longer side and the shorter side of the picture element region (the column direction and the row direction of the matrix arrangement). The direction in which the side extends differs by 90° between the upper half and the lower half of the picture element region. This structure of the regions corresponding to a single picture element region of the data electrode 714 is similar to that of the picture element electrode 314 illustrated in FIG. 3A, forming the orientation-regulating regions T1, T2, T3 and T4.

Thus, the picture element region of the liquid crystal display device of the present embodiment includes the orientation-regulating regions T1, T2, T3 and T4 having different liquid crystal molecule inclination directions (sometimes referred to as a "4-division multi-domain orientation"), thereby providing a desirable viewing angle characteristic as the liquid crystal display device of Embodiment 1. In the liquid crystal display device of the present embodiment, whether or not a desirable 4-division multi-domain orientation is realized for each picture element region according to the orientation-regulating forces produced respectively in the orientation-regulating regions T1, T2, T3 and T4 illustrated in FIG. 11 can be confirmed by observing with a microscope the picture element region from an inclined direction (with respect to the normal to the display plane).

Moreover, the liquid crystal display device is provided with the polarizers (including a polarizing plate, a polarizing film, and the like) 404 and 405, the phase difference compensation elements (including a phase plate, a phase film, and the like) 402 and 403, and the backlight 406, as illustrated in FIG. 4, thereby obtaining a transmission type liquid crystal display device of a normally black mode having a desirable display quality.

In Embodiments 1 to 3 above, a case where a 4-division multi-domain orientation is realized by using the electrode structure of the present invention has been described, but the present invention is not limited to such an example as described above.

Figure 12:
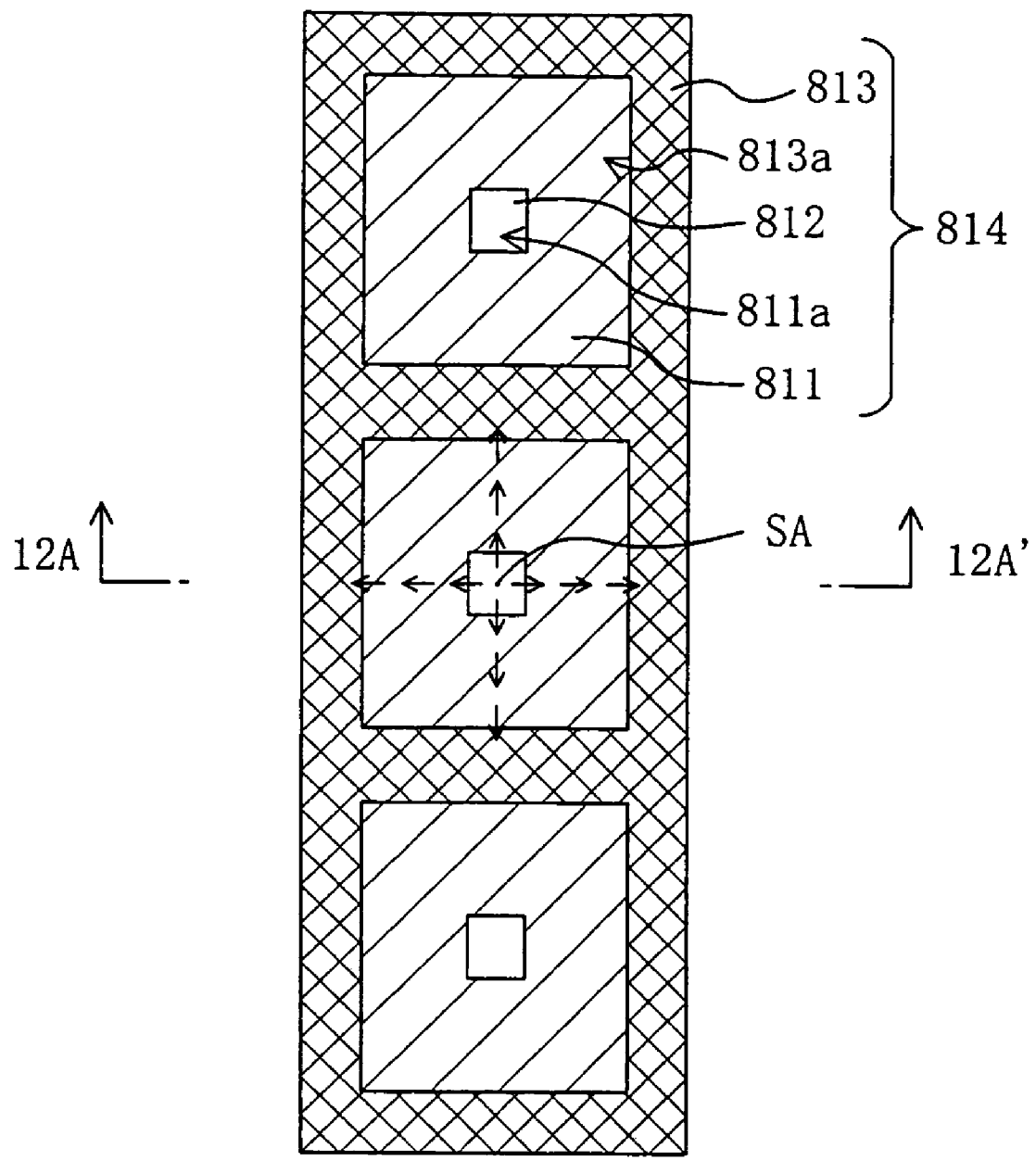
FIG. 12 is a diagram schematically illustrating the structure of a first electrode 814 used in a liquid crystal display device according to the present invention.

For example, an axially symmetric orientation can be realized by employing an electrode structure as illustrated in FIG. 12. A first electrode 814 illustrated in FIG. 12 can be used in place of the picture element electrode 314 illustrated in FIG. 3A, the counter electrode 614 illustrated in FIG. 8, or the data electrode 714 illustrated in FIG. 11.

The first electrode 814 includes a lower conductive layer 811, a dielectric layer 812 covering the lower conductive layer 811, and an upper conductive layer 813 provided on one side of the dielectric layer 812 which is closer to the liquid crystal layer. The upper conductive layer 813 provided corresponding to a rectangular picture element region includes three openings 813a each having a generally square shape. The lower conductive layer 811 includes lower layer openings 811a each of which has a shape similar to that of the upper layer opening 813a and which are respectively located generally at the center of the upper layer openings 813a. The upper conductive layer 813 and the lower conductive layer 811 are electrically connected to each other, for example, under the upper conductive layer 813, and thus are at the same potential. The dielectric layer 812 under the upper conductive layer 813 includes contact holes (not shown; not limited to holes, but may be grooves) for electrically connecting the upper conductive layer 813 and the lower conductive layer 811 to each other.

The cross-sectional structure of the first electrode 814 along, for example, line 12A-12A' is substantially the same as that of the region TT4 of the first electrode 14 shown in FIG. 1A and FIG. 1B, and the upper layer openings 813a and the lower layer openings 811a all have substantially the same cross-sectional structure along a line which includes the center SA thereof. Therefore, the first electrode 814 has an orientation-regulating force which inclines the liquid crystal molecules in an axially symmetrical orientation with respect to the center SA.

The shape of the lower layer opening 811a or the upper layer opening 813a is preferably close to a square so as to stabilize the axially symmetrical orientation, though it is not limited to a square. The size and arrangement of the lower layer openings 811a and the upper layer openings 813a can be suitably set as in the preceding embodiments in view of the viewing angle characteristic and the response characteristic. The two-dimensional arrangement of the openings in the electrode structure of the present invention is not limited to any of those described above, but various modifications thereto can be made.

In order to stably obtain an axially symmetrical orientation, it is preferred to mix an appropriate amount of chiral agent into a liquid crystal material. The amount of chiral agent to be mixed in is preferably such that the pitch of twist of the liquid crystal material having the chiral agent mixed therein is about ½ to about 10 times the thickness of the liquid crystal layer. More preferably, the amount of chiral agent to be mixed in is such that the twist angle of the liquid crystal molecules is 80° to 100° when the maximum voltage to be used is applied across the liquid crystal layer.

Moreover, in order to stably obtain an axially symmetrical orientation, the shape of the opening illustrated in FIG. 12 may be changed from a square to a circle or a polygon. However, in order to effectively use the picture element region, a square is most preferred. When a shape other than a square is selected, a regular hexagon is preferred because regular hexagons can be closely arranged within a rectangular picture element. Although a regular polygon is preferred in view of symmetry, it is possible to realize a substantially axially symmetrical orientation even if an irregular polygon is employed according to the shape of the picture element region, etc.

Also in the present embodiment, a liquid crystal display device having the structure illustrated in FIG. 12 can be used in place of the liquid crystal display device 300 of Embodiment 1 illustrated in FIG. 4. In such a case, the phase difference compensation elements 403 and 402 are suitably designed by using a technique known in the art. As a result, it is possible to obtain a liquid crystal display device having a desirable viewing angle characteristic as in Embodiment 1.

Where an axially symmetrical orientation is employed as in the present embodiment, it is preferred to employ, in the structure illustrated in FIG. 4, circular polarizers in place of the linear polarizers 404 and 405. The reason for this is as follows. a phase difference compensation element which most efficiently changes the polarization of linearly-polarized light is a phase difference compensation element which has a slow axis forming an angle of 45° with respect to the polarization axis of the linearly-polarized light. Therefore, in a liquid crystal display device where a pair of linear polarizers are arranged in a crossed-Nicols state as illustrated in FIG. 12, the highest light efficiency is obtained when the inclination direction of the liquid crystal molecules forms an angle which is an integral multiple of 45° with respect to the polarization axis of the polarizers. In contrast, in an axially symmetrical orientation, the orientation axis (orientation direction) of the liquid crystal molecules continuously changes, whereby it is not possible to satisfy the positional relationship between the polarization axis of the linearly-polarized light and the orientation axis for all of the orientation axes. A phase difference compensation element gives a change in the polarization in a constant amount (the absolute value of the phase difference) for circularly-polarized light irrespective of the angle of the slow axis. Therefore, in the present embodiment which employs a liquid crystal layer whose orientation axis continuously changes (which has an infinite number of slow axes), it is possible to obtain a liquid crystal display device having a high light efficiency by substituting the linear polarizers 404 and 405 with circular polarizers. In such a case, the phase difference compensation elements 402 and 403 can be suitably designed by using a technique known in the art.

As described above, according to the present invention, it is possible to give an orientation-regulating force from an electric field to a liquid crystal layer containing vertically-aligned liquid crystal molecules having a negative dielectric anisotropy. Therefore, according to the present invention, it is possible to obtain various types of liquid crystal display devices having a desirable viewing angle characteristic.

According to the present invention, it is possible to obtain a sufficient orientation-regulating force only by modifying the structure of one of a pair of electrodes for applying a voltage across a liquid crystal layer. Thus, it is possible to provide a vertical alignment type liquid crystal display device which has a sufficiently stable orientation and a sufficiently high response speed and yet can be produced efficiently.

By variously changing the structure of an electrode which uses two conductive layers each having openings, it is possible to realize a so-called multi-domain orientation (where there are a plurality of regions of different liquid crystal molecule inclination directions) or an axially symmetrical orientation, and thus to improve the viewing angle characteristic. Moreover, it is possible to change the magnitude of the orientation-regulating force by variously changing the electrode structure, whereby it is possible to optimize the response characteristic.

Moreover, the liquid crystal display device according to the present invention can be obtained only by changing the electrode structure in a conventional liquid crystal display device. Thus, the liquid crystal display device according to the present invention can be produced by using a conventional production method.

What is claimed is:

1. A liquid crystal display device, comprising:
a first substrate, a second substrate and a liquid crystal layer interposed between the first substrate and the second substrate, wherein:
a picture element region comprises a first electrode provided on one side of the first substrate which is closer to the liquid crystal layer and a second electrode provided on the second substrate so as to oppose the first electrode via the liquid crystal layer;
the liquid crystal layer is a vertical alignment type liquid crystal layer containing a liquid crystal material having a negative dielectric anisotropy; and
the picture element region includes at least one orientation-regulating region, the orientation-regulating region including a first region in which an electric field applied across the liquid crystal layer by the first electrode and the second electrode has a first electric field strength, a second region in which the electric field has a second electric field strength which is smaller than the first electric field strength, and a third region in which the electric field has a third electric field strength which is smaller than the second electric field strength, wherein the first, second and third regions are arranged in this order in a predetermined direction;

wherein a boundary between the first region and the second region, and a boundary between the second region and the third region, are each oriented so as to each extend substantially only in a single direction which is perpendicular to the predetermined direction;

wherein the display includes a plurality of the picture element regions including respective ones of the first electrodes arranged in a matrix having row and column directions, and wherein both the predetermined direction and the single direction are angled relative to the column direction;

a third electrode in the pixel element region, the first electrode being provided on one side of the first substrate which is closer to the liquid crystal layer than said third electrode;

wherein in said second region the electric field is applied across the liquid crystal layer by said third electrode and the second electrode and has a second electric field strength which is smaller than the first electric field strength, and wherein in the third region the electric field applied across the liquid crystal layer by at least a slit and/or aperture region of the third electrode and the second electrode has a third electric field strength which is smaller than the second electric field strength.

* * * * *